(12) United States Patent
Shinjo et al.

(10) Patent No.: US 8,103,697 B2
(45) Date of Patent: Jan. 24, 2012

(54) DATABASE INDEX KEY UPDATE METHOD AND PROGRAM

(75) Inventors: Toshio Shinjo, Chiba (JP); Mitsuhiro Kokubun, Chiba (JP)

(73) Assignee: S. Grants Co., Ltd., Chiba (JP)

( * ) Notice: Subject to any disclaimer, the term of this patent is extended or adjusted under 35 U.S.C. 154(b) by 28 days.

(21) Appl. No.: 12/801,649

(22) Filed: Jun. 18, 2010

(65) Prior Publication Data

US 2010/0262617 A1 Oct. 14, 2010

Related U.S. Application Data

(63) Continuation of application No. PCT/JP2008/003123, filed on Oct. 30, 2008.

(30) Foreign Application Priority Data

Dec. 28, 2007 (JP) ................................. 2007-338413

(51) Int. Cl.
*G06F 17/30* (2006.01)

(52) U.S. Cl. ........................................ 707/797; 707/706

(58) Field of Classification Search ........................ None
See application file for complete search history.

(56) References Cited

U.S. PATENT DOCUMENTS

| | | | | |
|---|---|---|---|---|
| 6,029,170 | A * | 2/2000 | Garger et al. ........................... | 1/1 |
| 6,389,413 | B2 * | 5/2002 | Takahashi et al. ............. | 707/740 |
| 6,594,655 | B2 * | 7/2003 | Tal et al. ....................... | 707/797 |
| 6,662,184 | B1 * | 12/2003 | Friedberg ....................... | 707/754 |
| 6,675,163 | B1 * | 1/2004 | Bass et al. .............................. | 1/1 |
| 6,785,699 | B1 * | 8/2004 | Andreev et al. ................ | 708/212 |
| 6,915,300 | B1 * | 7/2005 | Roux et al. ..................... | 707/706 |
| 6,934,252 | B2 * | 8/2005 | Mehrotra et al. ............. | 370/229 |
| 7,028,022 | B1 * | 4/2006 | Lightstone et al. ................... | 1/1 |
| 7,174,331 | B1 * | 2/2007 | Luo et al. .............................. | 1/1 |
| 2002/0184252 | A1 | 12/2002 | Holtz et al. | |
| 2004/0145777 | A1 * | 7/2004 | Satomi et al. ................ | 358/1.15 |
| 2007/0220420 | A1 * | 9/2007 | Sanders ........................ | 715/513 |
| 2009/0063400 | A1 * | 3/2009 | Borkar et al. ..................... | 707/2 |

FOREIGN PATENT DOCUMENTS

JP 2001-357070 A 12/2001

(Continued)

OTHER PUBLICATIONS

Shigeaki Yazaki, "Zu de Wakaru! Programming No. 10 Dai Kiso Chishiki", Nikkei Software, vol. 6, No. 2, pp. 44-45, Jan. 24, 2003.

(Continued)

*Primary Examiner* — Mohammad Ali
*Assistant Examiner* — Syed H Hasan
(74) *Attorney, Agent, or Firm* — Rader, Fishman & Grauer PLLC

(57) ABSTRACT

A method of database update processing for updating efficiently database index keys, when new database index keys are supplied to replace index keys already in the database, generates a delta data between the new and old data comprising insert and delete keys by delete processing from a coupled node tree holding the index keys in the old data using index keys of new data as delete keys, and generates new data by delete and insert processing from and into a coupled node tree holding index keys in old data as index keys using the delete keys and insert keys of the delta data.

14 Claims, 24 Drawing Sheets

FOREIGN PATENT DOCUMENTS

| | | |
|---|---|---|
| JP | 2008-15872 A | 1/2008 |
| JP | 2008-112240 A | 5/2008 |
| JP | 2008-159025 A | 7/2008 |
| JP | 2008-181260 A | 8/2008 |
| JP | 2008-269197 A | 11/2008 |
| WO | WO-2008/004335 A1 | 1/2008 |
| WO | WO-2008/044335 A1 | 1/2008 |
| WO | WO-2008/053583 A1 | 5/2008 |
| WO | WO-2008/065735 A1 | 6/2008 |
| WO | WO-2008/090588 A1 | 7/2008 |
| WO | WO-2008/132806 A1 | 11/2008 |

OTHER PUBLICATIONS

Daichi Goto, "Sawatte Manabu Data Kozo, Tsukatte Minitsuku Algorithm Kochira Java API Kenkyusho! Dai 6 Kai Nibunki to Nibun Tansakuki", vol. 34, pp. 202-210, Feb. 15, 2004.

Xin Li et al., "Stateful Inspection Firewall Session Table Processing", International Journal of Information Technology, vol. 11, No. 2, pp. 21-30, 2005.

International Search Report mailed on Dec. 2, 2008.

Supplemental European Search Report from European Patent Office for Application No. 08866463.6-2201 dated Aug. 16, 2011.

Nilsson et al., "IP-Address Lookup Using LC-Tries", IEEE Journal on Selected Areas in Communications, IEEE Service Center, Piscataway, US, vol. 17, No. 6, Jun. 1, 1999, pp. 1083-1092.

Sedgewick, "Algorithmen, 2.Auflage, Kapitel 17: Digitales Suchen", 2002, Addison-Wesley, Muchen, pp. 289-303.

Chawathe et al., "Change Detection in Hierarchically Structured Information", Sigmod Record, ACM, New York, NY, US, Jun. 4, 1996, pp. 1-31.

* cited by examiner

DATABASE INDEX KEY UPDATE METHOD AND PROGRAM

CROSS-REFERENCE TO RELATED APPLICATIONS

This application is a continuation of PCT/JP2008/003123 filed on Oct. 30, 2008, and is based and claims the benefit of priority of the prior Japanese Patent Application No. 2007-338413, filed on Dec. 28, 2007, the entire contents of which are incorporated herein by reference. The contents of PCT/JP2008/003123 are incorporated herein by reference in their entity.

BACKGROUND OF THE INVENTION

1. Field of the Invention

The present invention relates to a method that updates database index keys, and a method and apparatus that generates delta data related to those index keys, and a method, apparatus, and program that updates the delta data of those index keys.

2. Description of Related Art

In recent years, with advancements in information-based societies, large-scale databases have come to be used in various places. To search such large-scale databases, it is usual to search for a desired record, retrieving the desired record by using as indexes items within records associated with addresses at which each record is stored. Character strings in full-text searches can also be treated as index keys.

Because the index keys can be expressed as bit strings, the searching of a database is equivalent to searching for bit strings in the database.

First, as one instance of the art related to this invention, the above noted bit string search processing will be described. Various methods for bit string search processing are known.

Even among those methods, conventional art makes various refinements on the data structure in which bit strings are stored in order to perform the above-noted searching for bit strings at high speed. One of these is a tree structure known as a Patricia tree.

FIG. 1 shows an example of a Patricia tree used for searching processing in the above-noted conventional art. A node of a Patricia tree is formed to include an index key, a test bit position for a search key, and right and left link pointers. Although it is not explicitly shown, a node of course includes information for the purpose of accessing a record corresponding to the index key.

In the example shown in FIG. 1, the node 1750a that holds the index key "100010" is a root node, the test bit position 1730a of which is 0. The node 1750b is connected to the left link 1740a of the node 1750a, and the node 1750f is connected to the right link 1741a of the node 1750a.

The index key held by the node 1750b is "010011," and the test bit position 1730b is 1. The node 1750c is connected to the left link 1740b of the node 1750b, and the node 1750d is connected to the right link 1741b of the node 1750b. The index key held by the node 1750c is "000111," and the test bit position is 3. The index key held by the node 1750d is "011010," and the test bit position is 2.

The parts connected to the node 1750c by solid lines show the right and left link pointers of the node 1750c, and the left pointer 1740c that is not connected by the dotted line indicates that field is blank. The dotted line connection destination of the right pointer 1741c that is connected by a dotted line expresses the address indicated by the pointer, and in this case this indicates that the right pointer points to the node 1750c.

The right pointer 1741d of the node 1750d points to the node 1750d itself, and the node 1750e is connected to the left link 1740d. The index key held by 1750e is "010010," and the test bit position is 5. The left pointer 1740e of the node 1750e points to the node 1750b, and the right pointer 1741e of the node 1750e points to the node 1750e.

The index key held by the node 1750f is "101011," and the test bit position 1730f is 2. The node 1750g is connected to the left link 1740f of the node 1750f and the node 1750h is connected to the right link 1741f of the node 1750f.

The index key held by the node 1750g is "100011," and the test bit position 1730g is 5. The left pointer 1740g of the node 1750g points to the node 1750a, and the right pointer 1741g of the node 1750g points to the node 1750g.

The index key held by the node 1750h is "101100," and the test position 1730h is 3. The left pointer 1740h of the node 1750h points to the node 1750f, and the right pointer 1741h of the node 1750h points to the node 1750h.

In the example of FIG. 1, the configuration is such that, as the tree is traversed downward from the root node 1750a the test bit position of successive nodes increases.

When a search is performed with some search key, the search keys' bit values corresponding to test bit positions held in nodes are successively tested from the root node, and a judgment is made as to whether the bit value at a test bit position is 1 or 0, the right link being followed if the bit value is 1, and the left link being followed if the bit value is 0. Unless the test bit position of a link target node is larger than the bit position of the link origin node, that is, if the link target is not below but rather returns upward (the returning links shown by the dotted lines in FIG. 16 being called back links), a comparison is performed between the index key of the link target and the search key. It is assured that if the result of the comparison is that the values are equal the search succeeds, but if the result is non-equal, the search fails.

As described above, although search processing using a Patricia tree has the advantages of being able to perform a search by testing only the required bits, and of it only being necessary to perform an overall key comparison one time, there are the disadvantages of an increase in storage capacity caused by the inevitable two links from each node, the added complexity of the decision processing because of the existence of back links, delay in the search processing by comparison with an index key for the first time by returning by a back link, and the difficulty of data maintenance such as adding and deleting a node.

In order to resolve these disadvantages of the Patricia tree, there is, for example, the technology disclosed in Patent Reference 1 below. In the Patricia tree described in Patent Reference 1 below, by storing lower level sibling nodes in a contiguous area, the space need for pointers is reduced as well as by setting a bit in each node to show whether or not the next link is a back link the determination processing for back links is reduced.

However, even in the disclosure of Patent Reference 1 below, since each node always reserves an area for the index key and the area for a pointer, and a single pointer is used for storing lower level sibling nodes in a contiguous area as shown for example even in the parts of left pointer 1740c, right pointer 1741h, etc. that are the lowest level parts of the Patricia tree shown in FIG. 1, the same amount of space must be allocated, etc., and there is not a very big space reduction effect. Also the problem of the delay in the search processing caused by back links, and the difficulty of processing such as adding and deleting, etc., is not improved.

Next, database update processing is described, which is another kind of art related to this invention.

A data update function is a necessary function for a database system. This function has the disadvantage that, the larger the amount of data stored in the database grows, the more time needed for work such as adding or deleting, by batch processing, vast amounts of data stored in the current database.

There are two database batch update modes: the mode of updating the contents of the current database by add/change/delete data and the mode of replacing the current database in its entirety with the new database.

The latter database update mode is adopted when for example, the provider of the database data does not supply database update data when it is necessary to update the database, but rather supplies once again a new version of the data base with the data already updated. However, since the database cannot be used during the update job in this kind of database update mode, it is very inconvenient if the update job takes a long time.

Also a database normally consists of a data part that is the database proper and an index part for searching the data in the database proper. Thus, among the database update modes there is also an index part update mode, and in the update of this part, there are cases when a whole index is supplied after it has been updated and replaces in its entirety the index before update.

For example, if the map data index in a car navigation system is to be updated, the index data for new map data bought from the map data supplier is distributed from the computer center of the car navigation system supplier or the car dealer to each car that has that car navigation system installed, and the index data of each of those installed systems is updated. In this way, since all of the new index data is distributed, a large amount of data is distributed, and the map data update in each car navigation system takes a long time.

Patent document 1: Japanese Published Patent Application 2001-357070

SUMMARY OF THE INVENTION

Whereat, the issue for this invention is to provide a method of database update processing for updating efficiently database index keys when new database index keys are supplied to replace index keys already in the database.

In order to resolve the problems in the above-noted conventional art, in the Japanese patent application 2006-187827 the applicant proposed a bit string search using a coupled node tree, which tree is a tree structure for bit string searches formed by a root node and a node pair stored in adjacent areas that is formed by a branch node and a leaf node, branch nodes, or leaf nodes; the root node showing the start point of the tree and being a leaf node if there is only one node in the tree and being a branch node if there are two or more nodes in the tree; the branch node including a discrimination bit position in the search key and information indicating a position of one node of a node pair of a link target; and the leaf node containing index keys that are the target bit strings of a bit string search.

The above cited patent application shows a method for creating a coupled node tree from a set of received index keys and basic search methods using a coupled node tree, such as methods for searching for a single index key from that coupled node tree, etc.

Also the bit string searches may include various kinds of search requests, such as requests to find a minimum value or maximum value or searches for a value within a given range, etc. Regarding this point, this applicant proposed methods, etc., of obtaining maximum/minimum values of index keys included in any arbitrary subtree of a coupled node tree in the Japanese patent application 2006-293619.

The purpose of this invention is to realize a high-speed database index key update method applied to that coupled node tree.

In accordance with this invention, delta data is generated between the index keys of the old data and new data, and the old data is updated by the delta data, generating new data.

In that case, a delta generating tree, which is a coupled node tree, is obtained wherein the index keys for the old data (or, conversely, the new data) are stored as the index keys of the leaf nodes, and searching of the delta generating tree is performed using the index keys from the new data (or old data) as search keys, and index keys that match the search keys are deleted from the delta generating tree, and search keys that do not match the index keys in the old data (or the new data) are set as insert keys (or delete keys) in the delta data, and after searching by means of all the index keys for the old data (or the new data) is completed, the index keys of the old data left in the delta generating tree are set as delete keys (or insert keys) in the delta data, and thus the delta data is generated.

In the update of the old data into the new data by means of the delta data, an update target tree, which is a coupled node tree, is acquired that holds the index keys of the old data as the index keys of leaf nodes, and by deleting from the update target tree the keys corresponding to the delete keys that were extracted from the delta data and inserting in the update tree the keys corresponding to the insert keys that were extracted from the delta data, the new data are generated.

In accordance with this invention, by using a coupled node tree, delta data can be generated at a high speed. Then, what is distributed to sites to be updated will be the delta data rather than all the new data, the amount of data to be distributed can be reduced. Also, by using the coupled node tree even for updating of index keys, a high-speed data update is enabled.

DESCRIPTION OF THE PREFERRED EMBODIMENTS

First the coupled node tree premised in this invention and proposed by this i applicant previously in the above cited application is described using an example of storing a coupled node tree in an array. Although it is possible to use address information in a storage device as the data indicating the position of a link target held by a branch node, by using an array formed by array elements that can store the larger of the occupied storage capacity area between a branch node and a leaf node, it is possible to express the node position as an array element number, enabling a reduction of the amount of position information.

Figure 2A:
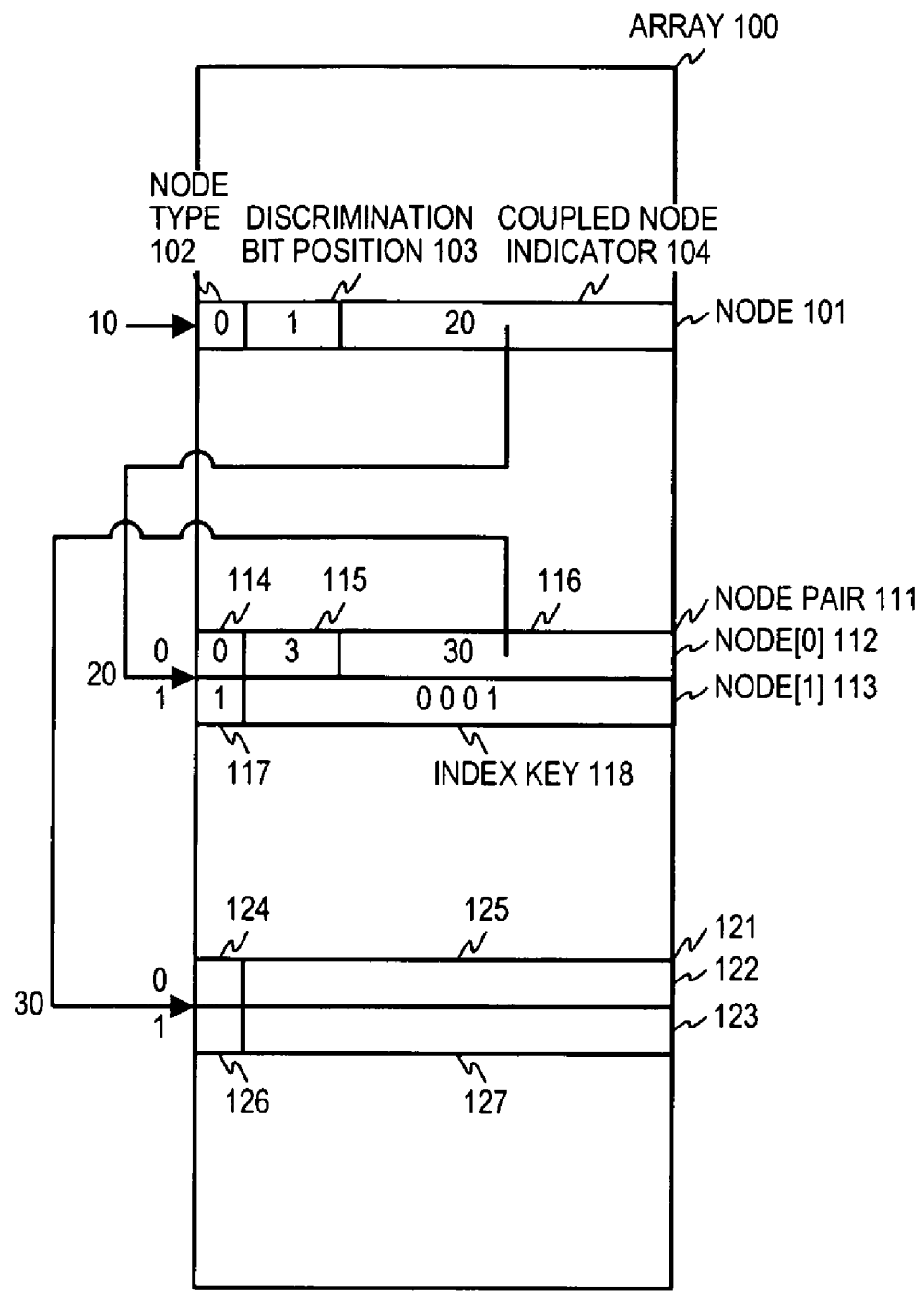
FIG. 2A is a drawing describing an exemplary configuration of a coupled node tree stored in an array.

FIG. 2A is a drawing that describes an exemplary configuration of a coupled node tree that is stored in an array.

Referring to FIG. 2A, a node 101 is located at the array element of the array 100 with the array element number 10. The node 101 is formed by a node type 102, a discrimination bit position 103, and a coupled node indicator 104. The node type 102 is 0, which indicates that the node 101 is a branch node. The value 1 is stored in the discrimination bit position 103. The coupled node indicator 104 has stored in it the array element number 20 of the primary node of the node pair of the link target. To simplify notation hereinafter, the array element number stored in a coupled node indicator is sometimes called the coupled node indicator. Also, the array element number stored in a coupled node indicator is sometimes expressed as the code appended to that node or the code attached to a node pair.

The array element having the array element number 20 has stored therein a node [0] 112, which is the primary node of the node pair 111. The secondary node [1] 113 forming a pair with the primary node is stored into the next, adjacent, array element (array element number 20+1). The value 0 is stored in the node type 114 of the node [0] 112, the value 3 is stored in the discrimination bit position 115, and the value 30 is stored in the coupled node indicator 116. The value 1 is stored in the node type 117 of the node [1] 113, thereby indicating that the node 1 [113] is a leaf node. The value "0001" is stored in the index key 118. In the same manner as in a Patricia tree described above, although information for accessing a record corresponding to an index key is of course included in a leaf node, this is omitted from the notation.

Primary nodes are indicated as the node [0], and secondary nodes that are paired therewith are indicated as the node [1]. Also the node stored in an array element with some array element number is called the node of that array element number and the array element number stored in the array element of that node is also called the array element number of the node.

The contents of the node pair 121 formed by the node 122 and the node 123 that are stored in the array elements having array element numbers 30 and 31 are not shown.

The 0 or 1 that is appended to the node [0]112, the node [1]113, the node 122, and the node 123 indicates respectively to which node of the node pair linking is to be done when performing a search using a search key. Linking is done to the node having an array element number that is derived by adding the 0 or 1, which is the bit value of the search key at the discrimination bit position of the immediately previous branch node, to the coupled node indicator of the branch node.

Therefore, by adding the bit value of the discrimination bit position of the search key to the coupled node indicator of the immediately previous branch node, it is possible to determine the array element number of an array element storing a node at the link target.

Although in the above-noted example the smaller of the array element numbers at which the node pair is located is used as the coupled node indicator, it will be understood that it is also possible to use the larger of the array element numbers in the same manner.

Figure 1:
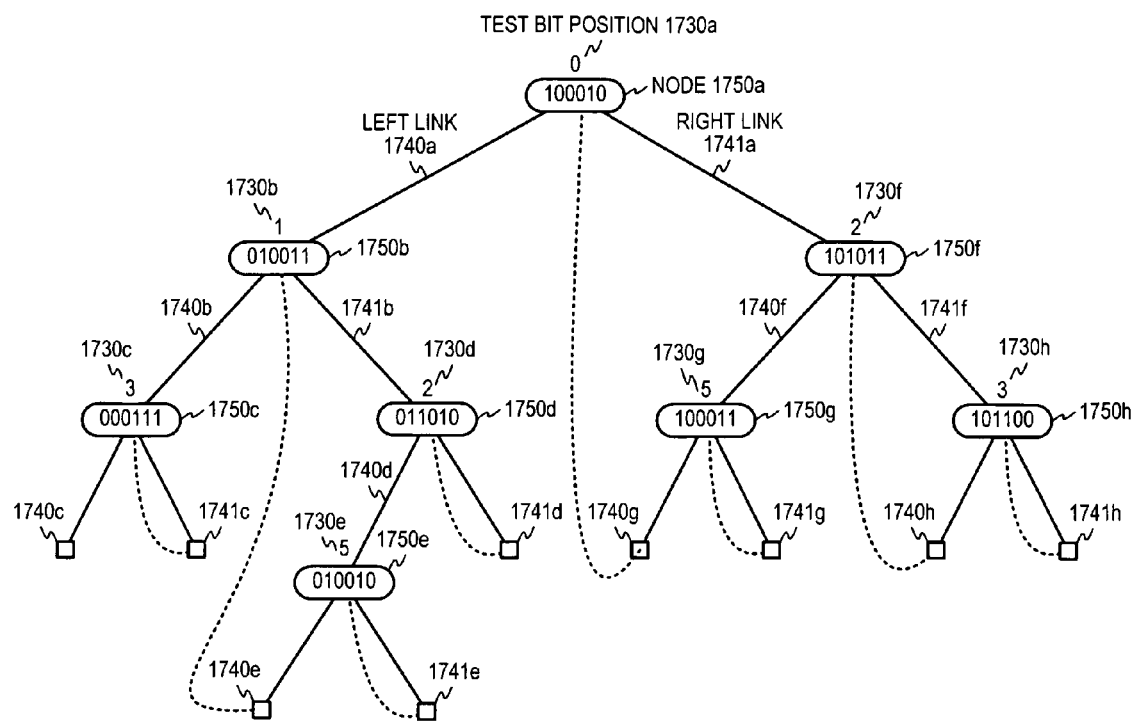
FIG. 1 is drawing showing an example of a Patricia tree used in searching in the past.
Figure 2B:
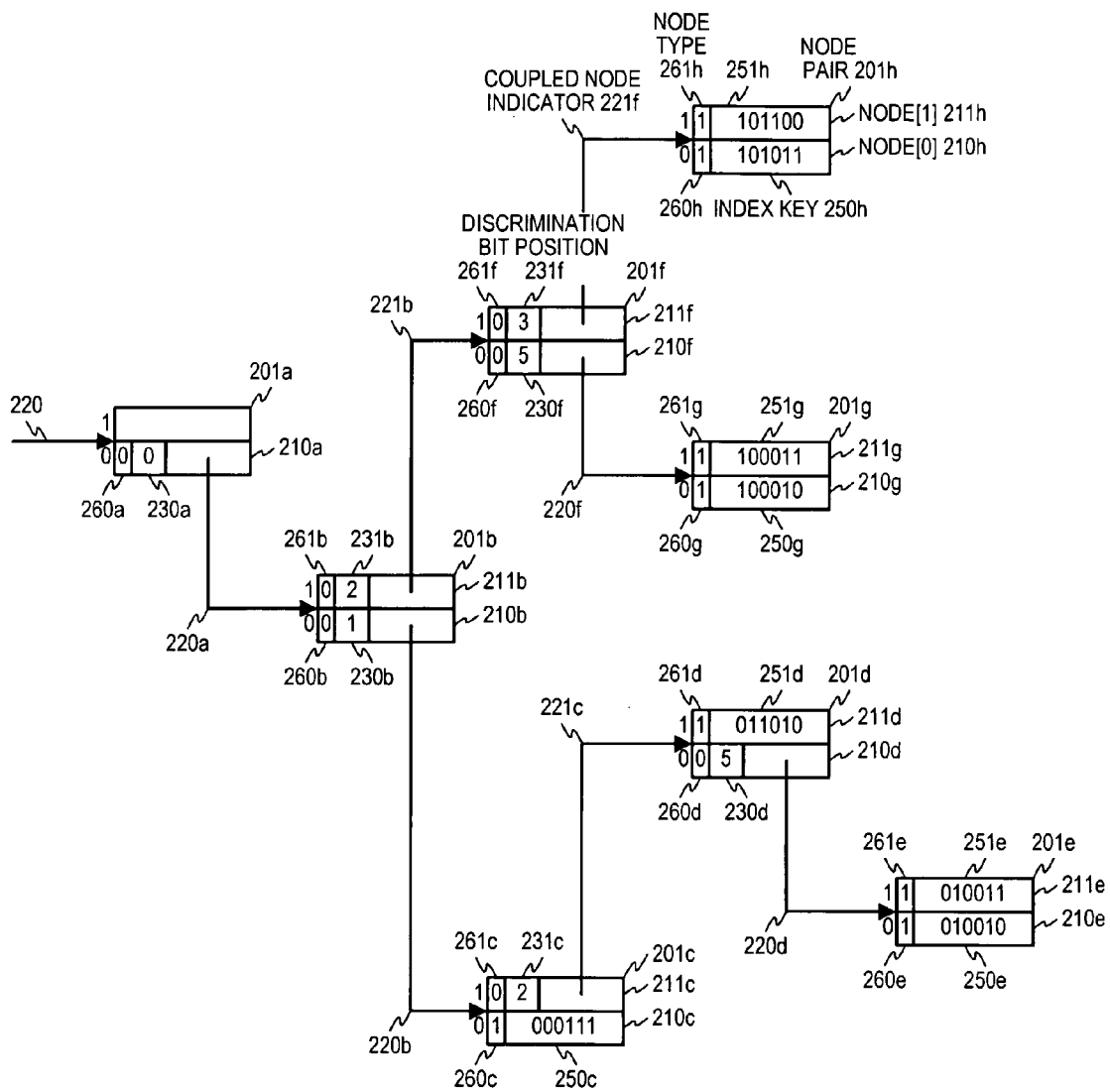
FIG. 2B is a drawing describing conceptually a tree structure of a coupled node tree.

FIG. 2B is a drawing that conceptually shows an embodiment of a tree structure of a coupled node tree. The 6-bit index key that is illustrated is the same as that of the Patricia tree shown as an example in FIG. 1.

The reference numeral 210a shows the root node. In the example shown, the root node 210a is the primary node of the node pair 201a located at the array element number 220.

In this tree structure, a node pair 201b is located below the root node 210a, and below that are located the node pair 201c and the node pair 201f. Below the node pair 201f are located the node pair 201h and the node pair 201g. Below the node pair 201c is located the node pair 201d, and below the node pair 201d is located the node pair 201e.

The 0 or 1 code that is appended before each node is the same as the codes that are appended before the array element numbers described in FIG. 1. The tree is traversed in accordance with the bit values at discrimination bit positions of the search key, so that the leaf node of the search for item is found.

In the example shown, the node type 260a of the root node 210a is 0, thereby indicating that this is a branch node, and the discrimination bit position 230a indicates 0. The coupled node indicator is 220a, which is the array element number of the array element in which the primary node 210b of the node pair 201b is stored.

The node pair 201b is formed by the node 210b and the node 211b, the node types 260b and 261b thereof both being 0, indicating branch nodes. The discrimination bit position 230b of the node 210b has 1 stored therein, and in the coupled node indicator of the link target is stored the array element number 220*b* of the array element in which is stored the primary node 210*c* of the node pair 201*c*.

Because 1 is stored in the node type 260*c* of the node 210*c*, this node is a leaf node, and thus includes an index key. "000111" is stored in the index key 250*c*. The node type 261*c* of the node 211*c* is 0, the discrimination bit position 231*c* of the node 211*c* is 2, and in the coupled node indicator is stored the array element number 221*c* of an array element in which is stored the primary node 210*d* of the node pair 201*d*.

The node type 260*d* of the node 210*d* is 0, the discrimination bit position 230*d* of the node 210*d* is 5, and in the coupled node indicator is stored the array element number 220*d* of an array element in which is stored the primary node 210*e* of the node 201*e*. The node type 261*d* of the node 211*d* that is paired with the node 210*d* is 1, and "011010" is stored in the index key 251*d*.

The node types 260*e* and 261*e* of the nodes 210*e* and 211*e* of the node pair 201*e* are both 1, indicating that both are leaf nodes. In the index keys 250*e* and 251*e* of each are stored "010010" and "010011" respectively as index keys.

The discrimination bit position 231*b* of the node 211*b*, which is the other node of the node pair 201*b*, has 2 stored therein, and the array element number 221*b* of the array element in which is stored the primary node 210*f* of the node pair 201*f* is stored in the coupled node indicator of the link target.

The node types 260*f* and 261*f* of the nodes 210*f* and 211*f* of the node pair 201*f* are both 0, indicating that both are branch nodes. In the discrimination bit positions 230*f* and 231*f* of each are stored 5 and 3, respectively. The array element number 220*f* of the array element in which is stored the primary node 210*g* of the node pair 201*g* is stored in the coupled node indicator of the node 210*f*, and the array element number 221*f* of an array element in which is stored the node [0] 210*h*, which is the primary node of the node pair 201*h*, is stored in the coupled node indicator of the node 211*f*.

The node types 260*g* and 261*g* of the nodes 210*g* and 211*g* of the node pair 201*g* are both 1, indicating that both are leaf nodes, and "100010" and "100011" are stored in the index keys 250*g* and 251*g* thereof, respectively.

In the same manner, the node types 260*h* and 261*h* of the node [0] 210*h* of the node pair 201*h*, and the node [1] 211*h*, which is paired therewith, are both 1, indicating that both are leaf nodes, and "101011" and "101100" are stored in the index keys 250*h* and 251*h* thereof, respectively.

The processing flow in searching for the index key "100010" from the above-noted tree is briefly described below. The discrimination bit positions are numbered 0, 1, 2, . . . and so on from the left.

First, processing is started from the root node 201*a* using the bit string "100010" as the search key. Because the discrimination bit position 230*a* of the root node 210*a* is 0, examining the bit value of the search key "100010" at the discrimination bit position 0 reveals 1. This being the case, 1 is added to the array element number 220*a* stored in the coupled node indicator and linking is done to the node 211*b* stored in the resulting array element number. Because 2 is stored in the discrimination bit position 231*b* of the node 211*b*, examination of the bit value of the search key "100010" at the discrimination bit position 2 reveals 0, resulting in linking to the node 210*f* stored in the array element having the array element number 221*b* stored in the coupled node indicator. Because 5 is stored in the discrimination bit position 230*f* of the node 210*f*, and because examination of the bit value of the discrimination bit position 5 of the search key "100010" reveals 0, linking is done to the node 210*g* stored in the array element having the array element number 220*f* stored in the coupled node indicator.

Because the node type 260*g* of the node 210*g* is 1, indicating a leaf node, the index key 250*g* is read out and a comparison is performed with the search key, thereby revealing coincidence between the two, both of which are "100010". Searching is performed in this manner using the coupled node tree.

Next, the significance of the configuration of the coupled node tree will be described, with reference made to FIG. 2B.

The configuration of the coupled node tree is prescribed by a set of index keys. In the example of FIG. 2B, the discrimination bit position of the root node 210*a* is 0 because there is an index key having a 0 at the 0th bit and an index key having a 1 at the 0th bit in the index keys shown in the embodiment example of FIG. 2. The group of index keys having 0 at the 0th bit is classified under the node 210*b*, and the group of index keys having 1 at the 0th bit is classified under the node 211*b*.

That the discrimination bit position of the node 211*b* is 2 reflects a property of the index keys, this being that the 1st bits of all the nodes 211*h*, 210*h*, 211*g*, and 210*g* are the same value 0, a difference therebetween first occurring at the 2nd bit.

Similar to the case of the 0th bit, the cases of the 2nd bit being 1 are classified on the node 211*f* side, and the cases of the 2nd bit being 0 are classified on the node 210*f* side.

Then because index keys having a 2nd bit that is 1 differ with regard to the 3rd bit, 3 is stored in the discrimination bit position of the node 211*f*, and because the 3rd and 4th bits of index keys having 0 as the 2nd bit are the same and differ at the 5th bit, 5 is stored in the discrimination bit position of the node 210*f*.

At the link target of the node 211*f*, because there is only one having a 3rd bit of 1 and one having a 3rd bit of 0, nodes 210*h* and 211*h* are leaf nodes, with "101011" and "101100" stored in the index keys 250*h* and 251*h*, respectively.

Even in the event that the index key set includes "101101" or "101110" in place of "101100," because there is equality with "101100" up until the 3rd bit, only the index key stored in the node 211*h* would change, there being no change in the structure of the tree itself. However, if "101101" is included in addition to "101100," the node 211*h* would become a branch node, the discrimination bit position thereof being 5. If the index key to be added is "101110," the discrimination bit position would be 4.

As described above, the coupled node tree structure is determined by the bit values of each bit position of the index keys included in the set of index keys.

To add to the above, because there is branching for each bit position having different bit values, meaning between a node that has a bit value of 1 and a node that has a bit value of 0, if the leaf nodes are traversed giving priority to the node [1] side and the tree depth direction, the index keys stored therewithin will be "101100" for the index key 251*h* of the node 211*h*, "101011" for the index key 250*h* of the node 210*h*, . . . , and "000111" for the index key 250*c* of the node 210*c*, these being sorted in descending order.

That is, in a coupled node tree the index keys are disposed in the tree in a sorted sequence.

When searching using a search key, the index key is followed over a path disposed on a coupled node tree, and in the case, for example of a search key "101100" it is possible to reach the node 211*h*. As can be imagined from the above-noted description, even if the search key is made "101101" or "101110," the node 211*h* will be reached, and a comparison with the index key 251*h* will result in the search failing.

Also, even in the case in which searching is done with "100100," in the link path of nodes 210*a*, 211*b*, and 210*f*, because the 3rd and 4th bits of the search key are not used and the 5th bit is 0, the node 210*g* will be reached, similar to the case searching with "100010." In this manner, the discrimination bit positions are used in accordance with bit makeup of the index keys stored in the coupled node tree to perform branching.

Next, the fundamentals of this invention are described.

Figure 3A:
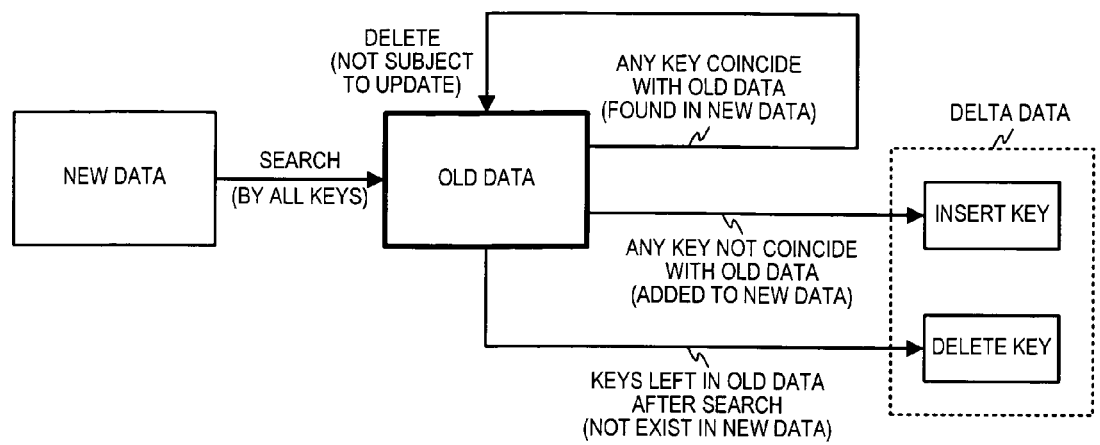
FIG. 3A is a schematic drawing describing the fundamentals for generating delta data from the old data and the new data of this invention.
Figure 3B:
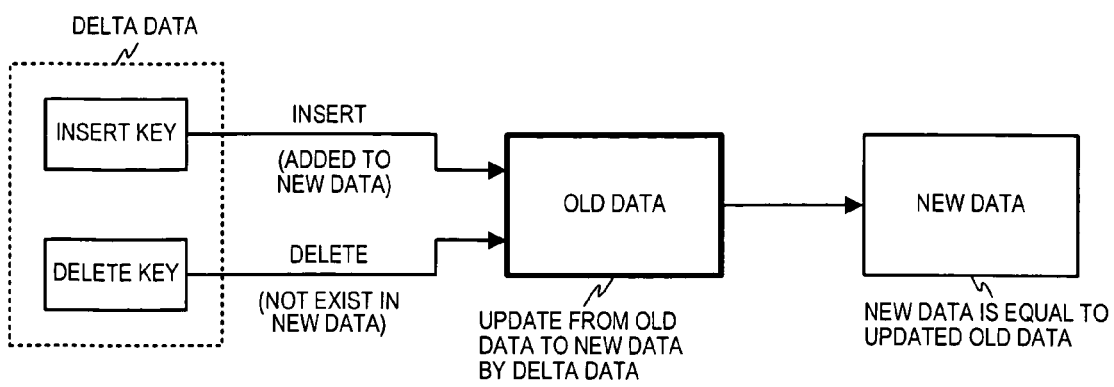
FIG. 3B is a schematic drawing describing the fundamentals for updating the old data into the new data using the delta data of this invention.

FIG. 3A and FIG. 3B are drawings showing schematically the fundamentals of this invention. FIG. 3A is a drawing describing the fundamentals of generating delta data from the old data and the new data, and FIG. 3B is a drawing describing the fundamentals of updating the old data into the new data using the delta data.

As shown in FIG. 3A, in order to generate delta data, the keys included in the old data are searched for by all the keys included in the new data. Any key that coincides with one in the old data, that is, any key that is in both the old data and the new data, is deleted from the copy of the old data because it is not subject to the update.

Any search key that does not coincide with one in the copy of the old data, that is, a key that has been added to the new data, is taken into the delta data as an insert key. Any key not found by the new data and left in the copy of the old data, that is, keys that do not exist in the new data, is taken into the delta data as a delete key.

Also, the above description was one in which the keys included in the copy of the old data are searched using all the keys included in the new data, it is clear that, since delta data is to be created, the delta data may also be created by one in which the keys included in the new data are searched using all the keys included in the old data. In that case, any key left in the copy of the new data is taken into the delta data as an insert key, and any key in the old data that did not coincide with those in the copy of the new data is taken into the delta data as a delete key.

As shown in FIG. 3B, in order to update old data with new data by means of delta data, the keys that exist in the new data but not in the old data are added to the original old data by means of an insert key, and keys that exist in the old data but not in the new data are deleted from the original old data by means of a delete key.

Figure 3C:
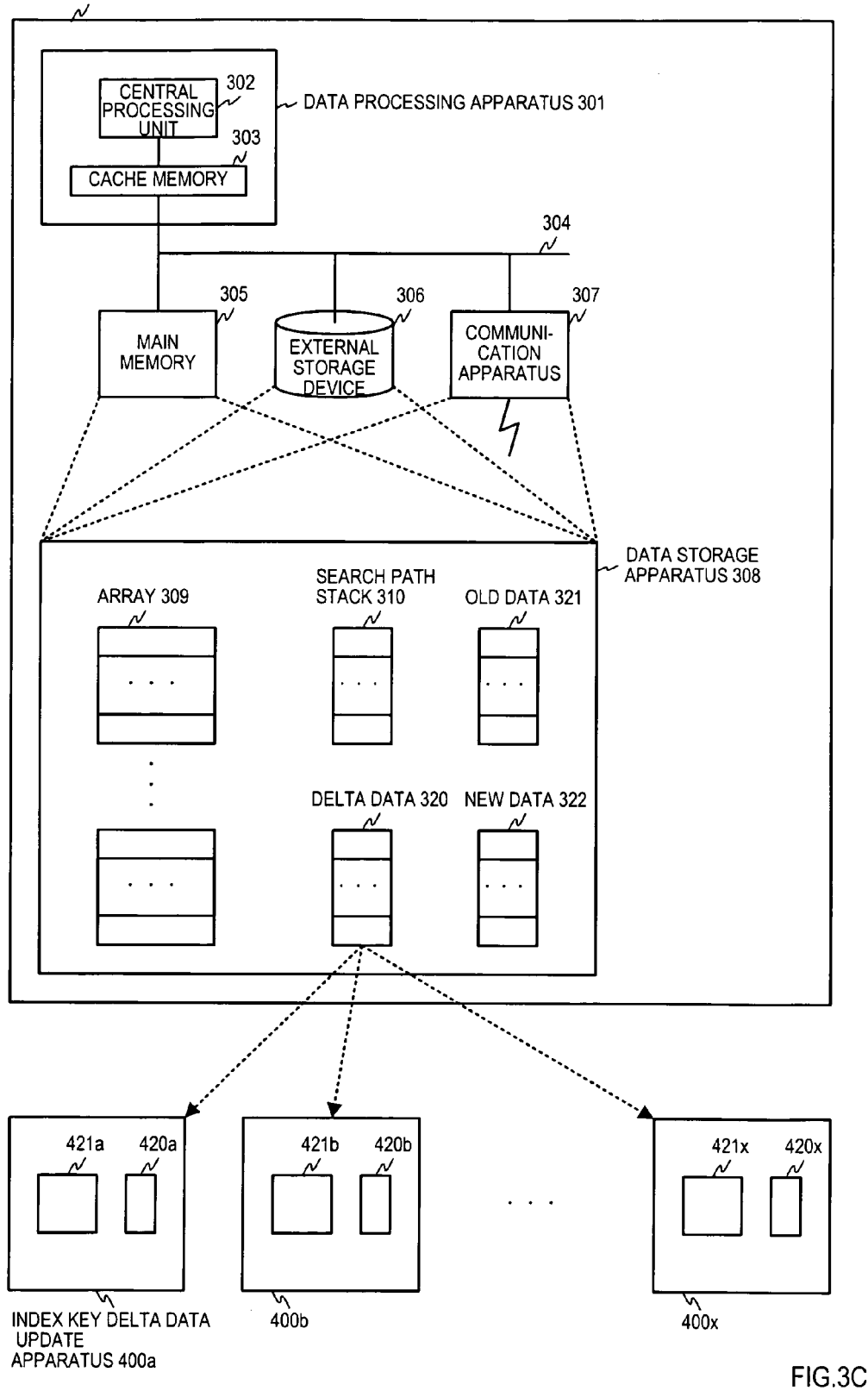
FIG. 3C is a drawing describing an exemplary hardware configuration for embodying the present invention.

FIG. 3C is a drawing describing an example of a hardware configuration for embodying the present invention. As shown in the drawing, the hardware configuration for embodying the present invention is configured of the delta data generation apparatus 300 and the index key delta data update apparatuses 400*a* to 400*x*. The number of the index key delta data update apparatuses 400*a* to 400*x* is arbitrary.

Delta data generation is implemented with the delta data generation apparatus 300 of the present invention by a data processing apparatus 301 having at least a central processing unit 302 and a cache memory 303, and a data storage apparatus 308. The data storage apparatus 308, which has an array 309 into which is disposed a coupled node tree, a search path stack 310, into which are stored array element numbers of nodes which are traversed during the search, and old data storage area 321 in which the old data is stored, and new data storage area 322, in which the new data is stored, and delta data storage area 320, in which the delta data is stored, can be implemented by a main memory 305 or an external storage device 306, or alternatively, by using a remotely disposed apparatus connected via a communication apparatus 307.

In the example shown in FIG. 3C, although the main memory 305, the external storage device 306, and the communication apparatus 307 are connected to the data processing apparatus 301 by a single bus 304, there is no restriction to this connection method. The main memory 305 can be disposed within the data processing apparatus 301, and can be implemented as hardware within the central processing unit 302. It will be understood that it is alternatively possible to select appropriate hardware elements in accordance with the usable hardware environment and the size of the index key set, for example, having the old data storage area 321, the new data storage area 322, and the delta data storage area 320 held in the storage device 306 and having the search path stack 310 held in the main memory 305, etc.

Also, although it is not particularly illustrated, a temporary memory area can of course be used to enable various values obtained during processing to be used in subsequent processing.

The delta data generated in the delta data generation apparatus 300 is transmitted to the index key delta data update apparatuses 400*a* to 400*x*, stored in the delta data store areas 420*a* to 420*x* respectively, and is used to update the old data stored in the index storage areas 421*a* to 421*x* respectively with the new data. Although it is not especially shown, a data processing apparatus and a data storage apparatus that holds the delta data storage area, the index storage area, and other storage areas are prepared even in the index key delta data update apparatuses 400*a* to 400*x*.

Also, hereinafter, in order to represent the delta data stored in the delta data storage area 320, as in the above cited example, as delta data 320, the description may use the reference codes of the data storage area and affix them to the data that is itself stored in that data storage area.

Figure 3D:
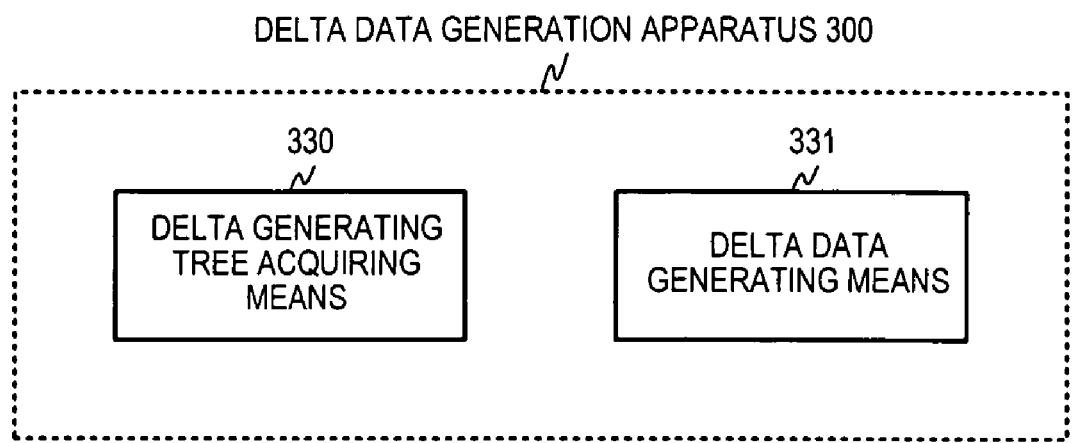
FIG. 3D is a drawing describing a function block configuration of a delta data generation apparatus.

FIG. 3D is a drawing describing the function block configuration of the delta data generation apparatus 300.

As shown in the drawing, the delta data generation apparatus 300 includes the function blocks of the delta generating tree acquiring means 330 and the delta data generating means 331. These function blocks are implemented by hardware illustratively shown in FIG. 3C and in software that executes the process flow described hereinafter.

The delta generating tree acquiring means 330 acquires the delta generating tree wherein are stored, as index keys of leaf nodes in a coupled node tree the index keys of the old data or the new data. The delta data generating means 331 performs a search of all the index keys in the new data (or old data) with the root node of the delta generating tree as a search start node and deletes from the delta generating tree any index key that is a search result key and matches the search key, and any search result key that does not match the search key is made an insert key (or delete key) in the delta data. Then after the search with all of the keys of the new data (or the old data) completes, the index keys that were left and not deleted from the delta generating tree generate the delta data as a delta data delete key (or insert key).

Figure 3E:
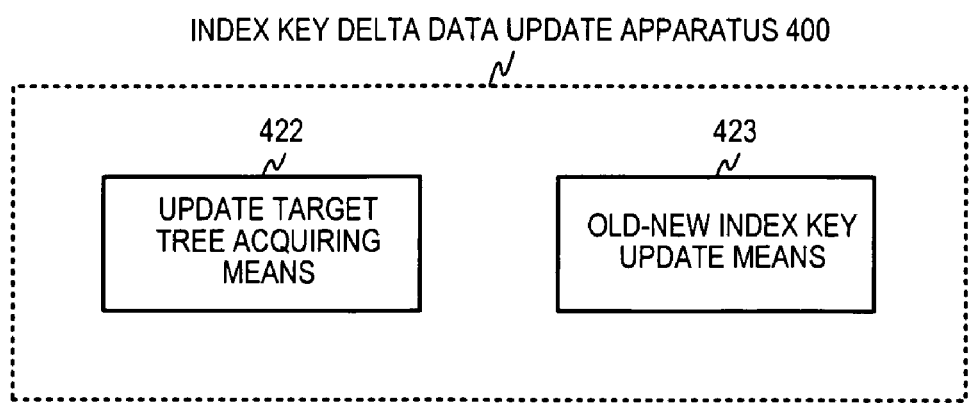
FIG. 3E is a drawing describing a function block configuration of a delta data updating apparatus.

FIG. 3E is a drawing describing the function block configuration of the index key delta data update apparatus.

As shown in the drawing, the index key delta data update apparatus 400 includes the function blocks for the update target tree acquiring means 422 and the old-new index key update means 423. These function blocks are realized by the hardware described by the index key delta data update apparatus 400*a* to 400*x* shown in FIG. 3C and/or in software executing the process flow described hereinafter.

The update target tree acquiring means 422 acquires an update target tree holding the index keys of the old data as index keys in leaf nodes of a coupled node tree.

The old-new index key update means 423 deletes from the update target tree the delete keys extracted from the delta data generated by the delta data generating means 331 and generates, by inserting in the update target tree the insert keys extracted from the delta data, a new data coupled node tree holding the new data index keys as index keys of leaf nodes, and based on the new data coupled node tree updates the old data into the new data.

Next, the basic search processing using the coupled node tree proposed by this applicant in the previously cited patent application and some of the applied processing, such as the processing that obtains the maximum/minimum values for the index keys included in the coupled node tree, will be introduced to the extent necessary to understand this invention.

Figure 4:
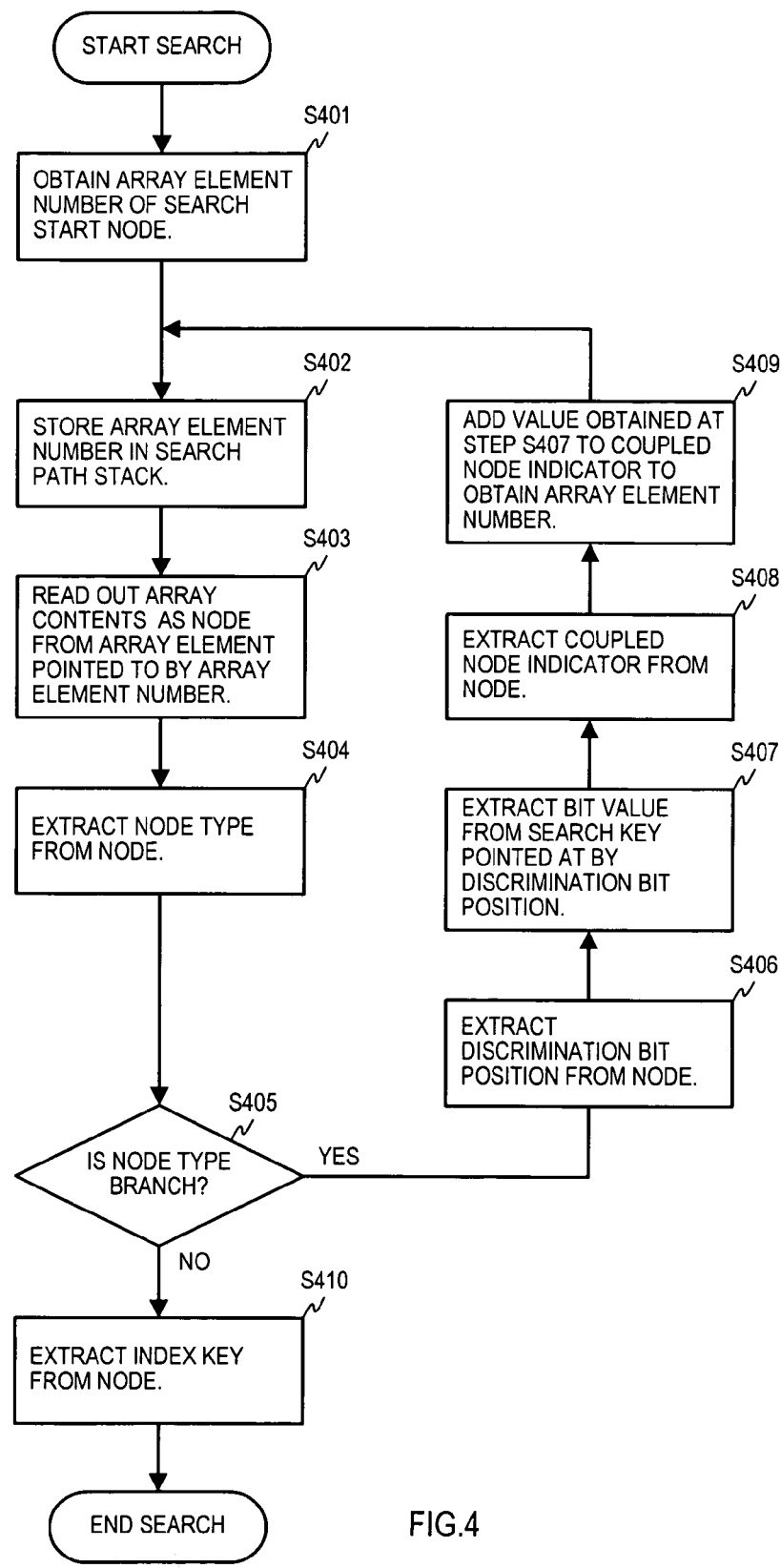
FIG. 4 is a flowchart showing the basic operations of a bit string search.

FIG. 4 is a flowchart showing the basic operations of a bit string search proposed in Japanese Patent Application 2006-293619, previously filed by the applicant of the present invention.

First, in step S401 the array element number of the search start node is acquired. The search start node can be any node configuring the coupled node tree and it is stored in the array position that corresponds to the acquired array element number. How the search start node is specified will be described later in the descriptions of the various search applications.

The array element number of the acquired search start node is set in an unshown search start node setting area. This search start node setting area is one of the "temporary memory areas used to enable various values obtained during processing to be used in subsequent processing". In the descriptions hereinafter, instead of an expression like "set in an unshown search start node setting area," the expressions "obtain the array number of the search start node" or "set as the search start node" or simply "set in the search start node" may be used.

Next, at step S402, the array element number acquired is stored on the search path stack 310. Proceeding to step S403, the array element of the array element number is read out as a node to be referenced. At step S404, the node type is extracted from the read out node. Next at step S405, a determination is made as to whether the node type indicates a branch node or not.

If the determination made at step S405 is that the node type is for a branch node, processing proceeds to step S406. At step S406, the discrimination bit position is extracted from the node. Next, at step S407, the bit value of the search key at the discrimination bit position extracted at step S406 is obtained. Next, proceeding to step S408, the array element number of the primary node of the node pair of the link target is obtained from the node. Then, proceeding to step S409, the bit value obtained at step S407 is added to the array element number obtained at step S408, thereby obtaining the array element number of the link target node, and return is made to step S402.

Thereafter, the processing from step S402 to step S409 is repeated until the determination at step S405 is that the node is a leaf node and processing proceeds to step S410. At step S410, the index key is extracted from the leaf node, and processing ends.

Figure 5:
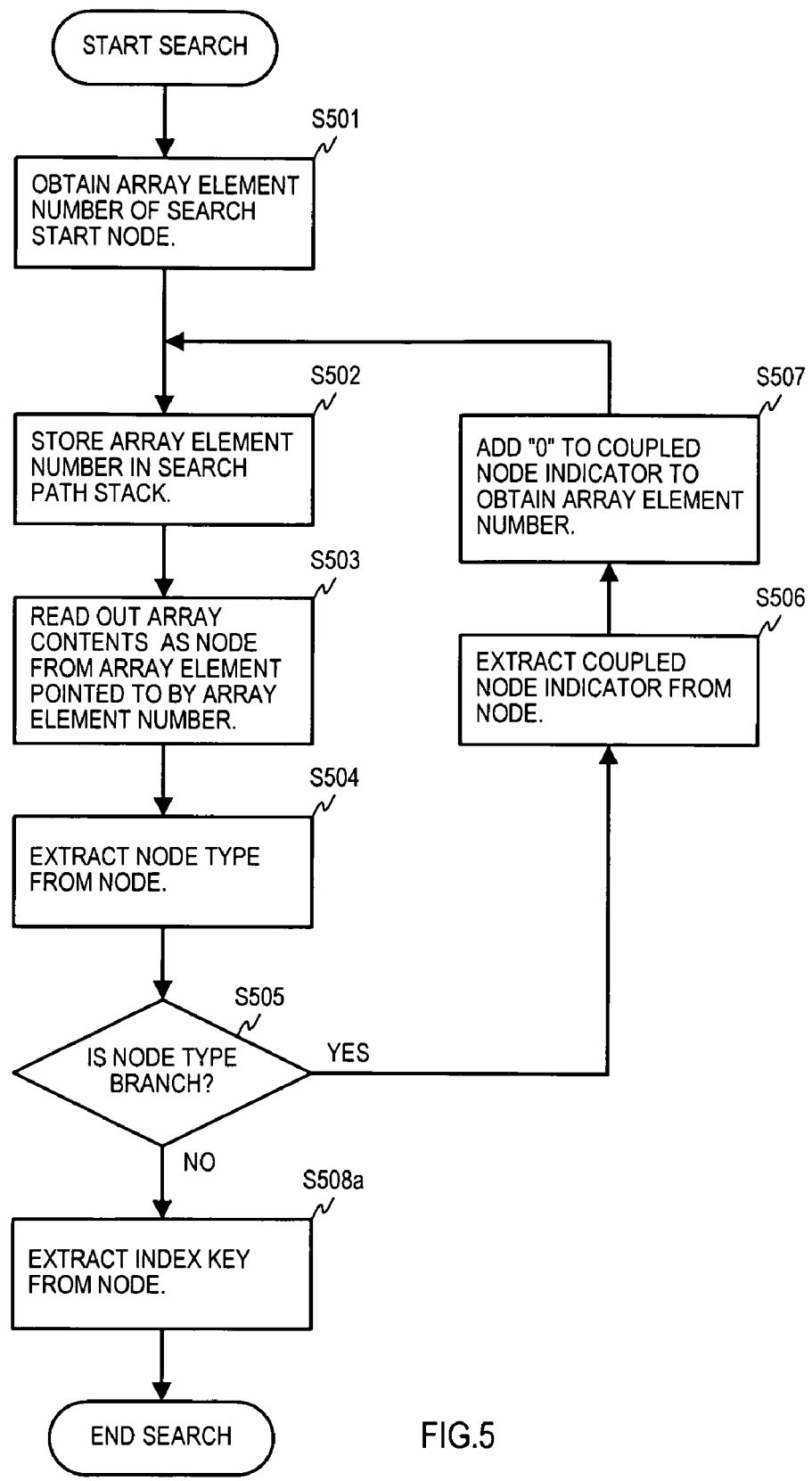
FIG. 5 is a drawing describing the processing when requesting the minimum key value stored in a coupled node tree.

The flowchart in FIG. 5 is the flowchart for obtaining the minimum value of the index keys stored in a coupled node tree (including subtrees) proposed in Japanese Patent Application 2006-293619, previously filed by the applicants of the present invention. As was noted above regarding the position of the index keys on the tree, the processing to obtain the minimum value of the index keys is equivalent to traversing nodes [0] from the search start node until a leaf node is reached.

First, the processing from the acquiring of the array element number of the search start node at step S501 until the node type determination at step S505 is similar to the processing from step S401 to step S405 of FIG. 4.

If the node type, is determined to be branch node in the node type determination made at step S505, processing proceeds to step S506, at which the coupled node indicator of the array is extracted from the node and, at step S507, the value "0" is added to the extracted coupled node indicator and taken as the new array element number, after which return is made to step S502. Thereafter, the processing from step S502 to step S507 is repeated until the node is determined to be leaf node at step S505, and at step S508 the index key is extracted from the leaf node, at which time processing ends.

In the above-noted processing shown in FIG. 5, in order to traverse the node [0], "0" is always added to the coupled node indicator. That is, according to the processing of FIG. 5, the node of a link target is always taken as the node [0] of a node pair, and branching is done to the node storing the index key with the smaller value. By doing this, the tree structure enables extraction of the minimum index key of the coupled node tree, which is a sequentially configured as described above.

Also, although it is not shown, in step S507 of FIG. 5, if the value "1" is used instead of the value "0" when adding to the coupled node indicator, the nodes [1] will be traversed and the maximum index key in the coupled node tree can be extracted.

Figure 6:
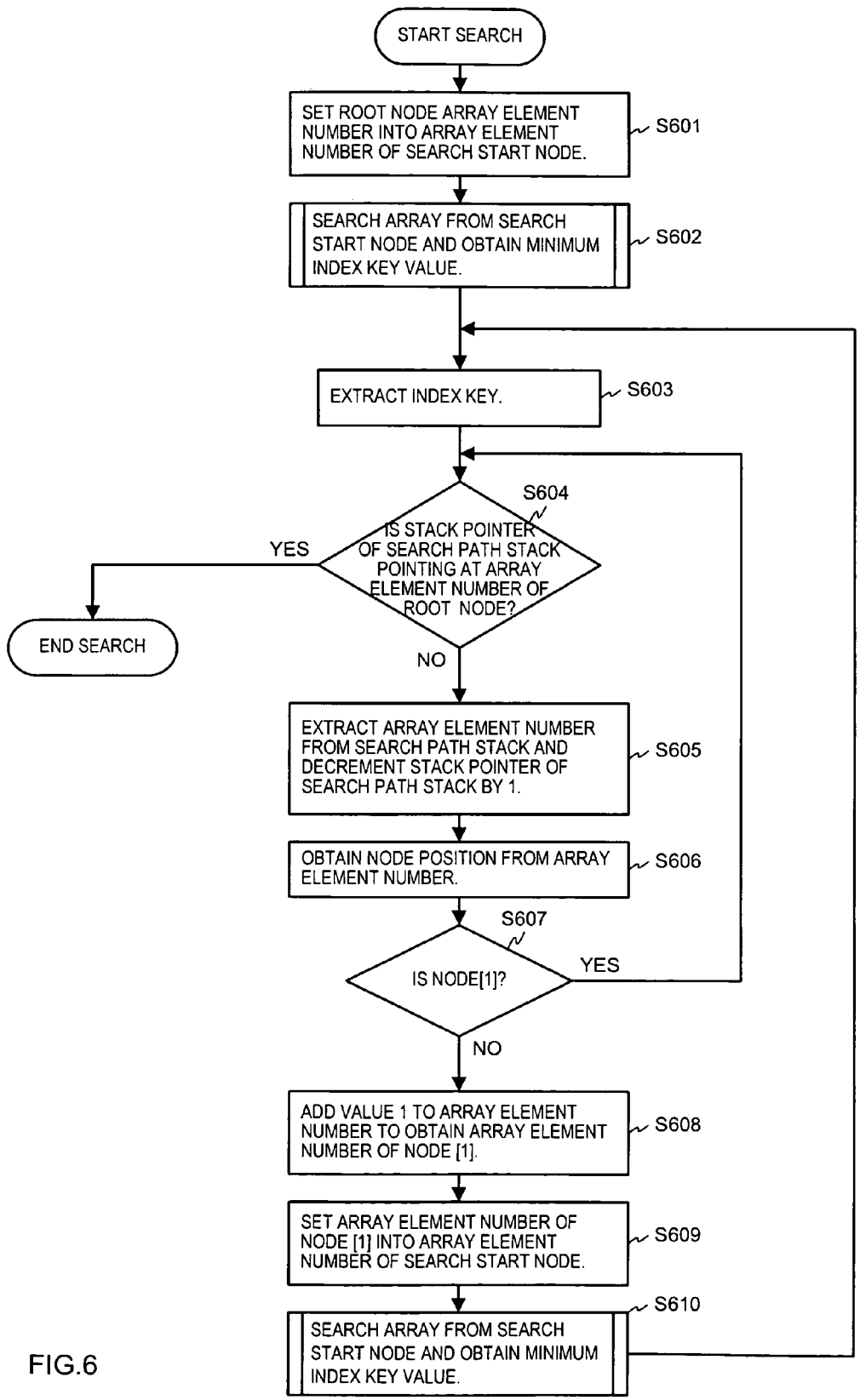
FIG. 6 is a flowchart showing the processing when extracting, in ascending order, index key values stored in a coupled node tree.

FIG. 6 is the flowchart showing the process to extract, in ascending order, index keys stored in a coupled node tree. The process to extract index keys in ascending order is equivalent to traversing the nodes successively, giving priority to the node [0] side of the node pairs and the tree depth direction, and extracting the index key from each leaf node.

First, in step S601, the array element number of the root node is set in the array element number of the search start node, and in step S602 the process to obtain the minimum index key explained using references to the above FIG. 5 is executed, and the minimum index key of all the index keys included in the coupled node tree is acquired. Then the index key acquired is extracted in step S603 and processing proceeds to step S604.

In step S604, the search path stack 310 is referenced and a determination is made whether the stack pointer is pointing to the array element number of the root node. If the array element number pointed to by the pointer is other than that of the root node, processing proceeds to step S605. Then, in step S605, after extracting the array element number pointed to by the pointer from the search path stack 310, the pointer is decremented by 1.

In step S606, the node position of whichever of the two nodes in the node pair the array element is stored is obtained from the array element number extracted in step S605. For example, by storing node [0] in the array element with an even position number in the array or other such, the node position can be obtained from array element number. Then, in step S607 a determination is made as to whether the node position obtained in step S606 is the node [1] side of the node pair or not. If in step S607 the determination is that it is the node [1] side, returning to step S604, processing is repeated from step S604 to step S607 until the node of the array element number pointed to by the pointer is either node [0] or the root node. If in step S607 the determination is that it is a node [0] side, proceeding to step S608, "1" is added to the array element number and the array element number of the node [1] paired with that node is obtained. Then, in step S609, the array element number of node [1] obtained in step S608 is set as the search start node and in step S610, the processing to obtain the minimum index key from the subtree with the search start node as its root node is executed. The processing in step S610 is the same as that in step S602 and the minimum value search processing shown in FIG. 5 is used.

When the minimum index key is obtained in step S610, returning to step S603, the obtained index key is extracted and from then on, the same process is repeated until a determination can be made in step S604 that the pointer points to the array element number of the root node.

In this way, the array element number pointed by the pointer of search path stack 310 is referenced, and the node [1] that is a pair with the node [0] with the array element number stored in search path stack 310 is made the search start node and the minimum index key underneath that key is obtained. At the stage in step S602 wherein the minimum value is obtained, the pointer of search path stack 310 points to the array element number of the node that includes the minimum index key in the coupled node tree. Next the pointer to the search path stack 310 is decremented by 1 and the node [1] of the nodes for the array element number extracted therein is made the search start node and the minimum value for the index keys in the subtree for which the index start key is the root node is obtained, and the pointer operations and minimum value search processing is repeated until the pointer operation on search path stack 310 extracts the array element number of the root node of the coupled node tree.

Firstly in step S602, by obtaining the minimum value of the nodes underneath the root node, the array element numbers of the link path are successively stored in search path stack 310. For this reason, when the pointer for search path stack 310 is decremented by "1", and the node [1] is obtained that pairs with a node [0] which is among those nodes whose array element number is pointed to by the new pointer, and minimum value search processing is successively executed on the nodes beneath node [1], the index keys are extracted in ascending order.

Just as it was stated above that a minimum value search can be modified into a maximum value search, it will be obvious to one skilled in the art that the index keys can be extracted in descending order by performing a maximum value search instead of a minimum value search and replacing the determination of a node [1] with a determination of a node [0] and so forth.

Figure 7A:
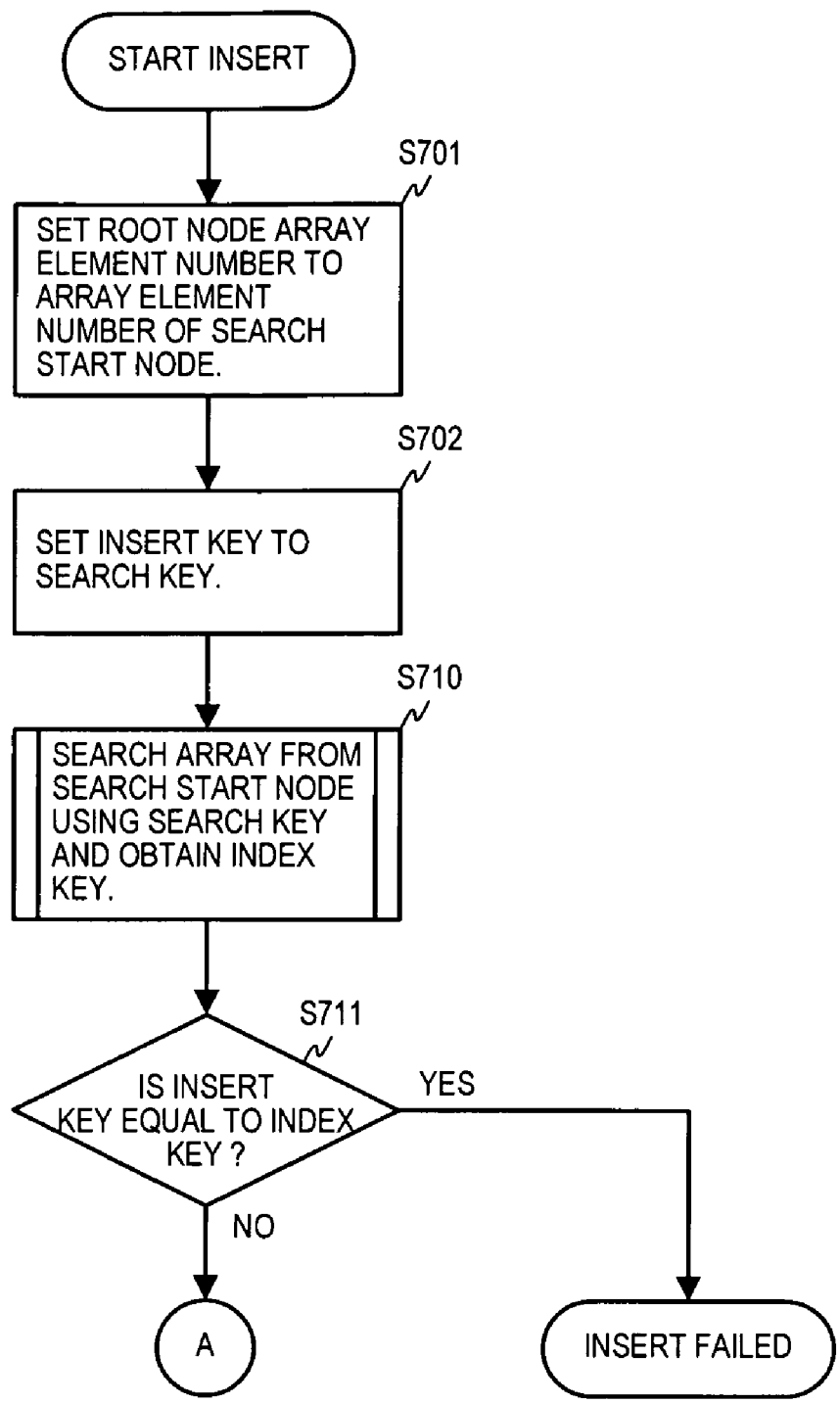
FIG. 7A is a drawing showing the flow of search processing, which is the first part of the insert processing.
Figure 7B:
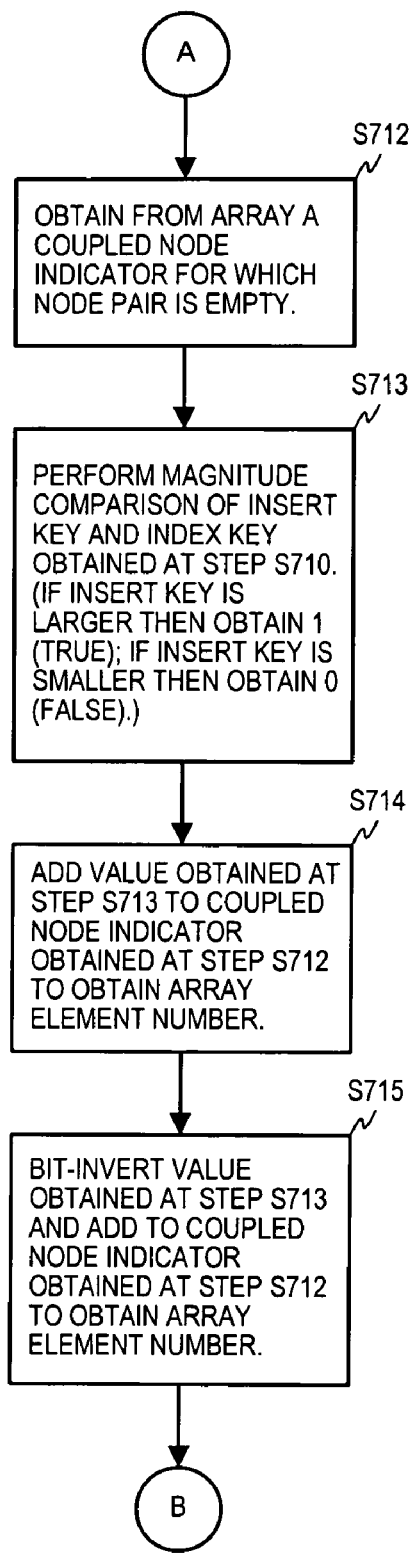
FIG. 7B is a drawing describing the processing flow for preparing array elements for a node pair to be inserted.
Figure 7C:
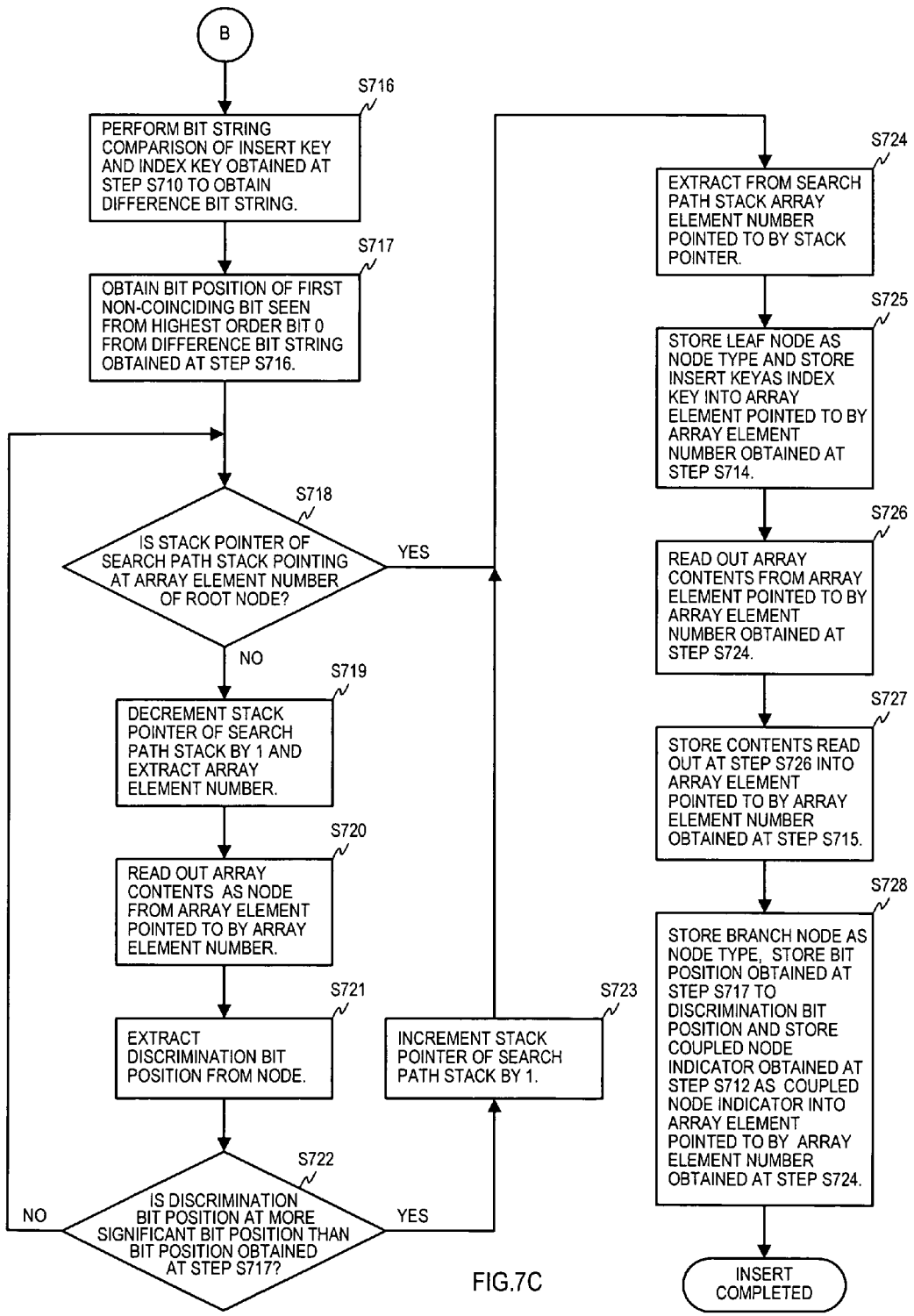
FIG. 7C is a drawing showing the processing flow for determining the position at which a node pair is to be inserted, and the storing of the content of each node of the node pair to complete the insert processing.

Next, FIG. 7A to FIG. 7D will be used to described the node insert processing in a coupled node tree proposed in Japanese Patent Application 2006-293619, previously filed by the applicant of the present invention. FIG. 7A to FIG. 7C describe the usual insert processing, and FIG. 7D describes the processing for insert of a root node. By root node insert processing and usual insert processing, because a coupled node tree is generated, the description of the node insert processing is also a description of the processing to generate a coupled node tree.

FIG. 7A is a drawing showing the processing flow for search processing, which is the first stage of insert processing, this corresponding to the using of an insert key as a search key in the search processing shown in FIG. 4.

In step S701, the array element number of the root node is set in the area for setting the array element number of the search start node, and in step S702 the insert key is set in the search key.

Next, in step S710, the search processing shown in FIG. 4 is executed and an index key that is the search result is obtained and processing proceeds to step S711.

In step S711, a comparison is performed between the insert key and the index key and, because if there is equality the insert key already exists in the coupled node tree, the insert fails, and processing ends. If however, there is no equality, processing proceeds to step S712 and thereafter in FIG. 7B.

FIG. 7B is a processing flowchart describing the processing to prepare array elements for a node pair to be inserted.

At step S712, an empty node pair is obtained from the array, and the array element number of the array element to be made the primary node of the node pair is acquired.

Proceeding to step S713, a magnitude comparison is performed between the insert key and the index key acquired at step S710 and, if the insert key is larger, the Boolean value 1 is obtained, but if the insert key is smaller, the Boolean value 0 is obtained.

Proceeding to step S714, the Boolean value obtained at step S713 is added to the array element number of the primary node obtained at step S712 to obtain an array element number.

Proceeding to step S715, the logical negation value of the Boolean value obtained at step S713 is added to the array element number of the primary node obtained at step S712 to obtain an array element number.

The array element number obtained at step S714 is the array element number of the array element into which a leaf node having the insert key as an index key is stored, and the array element number obtained at step S715 is the array element number into which a node that forms a pair with that leaf node is stored.

That is, by means of the magnitude relationship between the index key stored in the leaf node obtained by the first stage of search processing and the insert key, a determination is made into which node of the node pair to be inserted the leaf node holding the insert key is to be stored.

For example, in the case in which "011011" is to be inserted into the coupled node tree of FIG. 2B, the index key resulting from the search is the "011010" that is stored in node 211*d*. A Boolean value is obtained by performing a magnitude comparison between the insert key "011011" and the index key "011010" stored in the node 211*d*, and, in this example, because the insert key is larger, the Boolean value 1 is obtained, so that the leaf node that holds the insert key is stored in an array element having an array element number obtained by adding 1 to the array element number of the primary node of the node pair to be inserted. The index key "011010" is stored in an array element having an array element number obtained by adding the logical negation value of the Boolean value obtained by the magnitude comparison to the array element number of the primary node.

When this is done, because the index key "011010" and the insert key "011011" differ at the 5th bit, the node 211*d* is a branch node, with a discrimination bit position of 5 and a coupled node indicator that is the array element number of the primary node of the inserted node pair.

In the case also in which "011001" is to be inserted into the coupled node tree of FIG. 2B, the index key resulting from the search is "011010" that is stored in node 211*d*. In this case, because the insert key is smaller, the Boolean value 0 is obtained, so that the leaf node that holds the insert key is stored in an array element having an array element number obtained by adding 0 to the array element number of primary node of the node pair to be inserted. Then, because the index key "011010" and the insert key "011001" differ at the 4th bit, the node 211*d* is a branch node with a discrimination bit position of 4 and a coupled node indicator that is the array element number of the primary node of the inserted node pair. Next, processing proceeds to the processing of step S716 and thereafter in FIG. 7C.

FIG. 7C is a drawing showing the processing flow of storing a node in the array prepared as shown in FIG. 7B, determining the insert position therein, and changing the contents of an existing node to complete the insert processing.

The processing from step S716 to step S723 is processing to determine the position on the coupled node tree for insert of a node pair, and the processing of step S724 and thereafter is processing for setting data in each node and completing the insert processing.

At step S716, an exclusive-OR, for example, is obtained of the insert key and the index key obtained at step S710 so as to obtain a difference bit string.

Proceeding to step S717, from the difference bit string obtained at step S716 the first bit position starting from the most-significant 0th bit at which there is a non-coincidence is obtained. This processing can be performed by, for example, a CPU having a priority encoder, the difference bit string being input thereto and the difference bit position being obtained. It is alternatively possible to perform the equivalent processing using software, to obtain the first bit position at which there is non-coincidence.

Next, proceeding to step S718, a determination is made as to whether the stack pointer of the search path pointer is pointing at the array element number of the root node. If it is, processing proceeds to step S724, but if it is not processing proceeds to step S719.

At step S719, the stack pointer of the search path stack is decremented by 1, and the array element number stacked at that point is extracted.

Proceeding to step S720, the array element with the array element number obtained in step S719 is read out from the array as a node.

Proceeding to step S721, the discrimination bit position is obtained from the node read out in step S720.

Next, proceeding to step S722, a judgment is made as to whether the discrimination bit position read out at step S720 is of higher order than the bit position obtained at step S717. In this case, the term higher order means more to the left in the bit string, that is, having a lower bit position value.

If the result of the judgment at step S722 is negative, return is made to step S718, and repetition is done until either the judgment at step S718 is affirmative or the judgment at step S722 is affirmative. When an affirmative judgment results at step S722, at step S723 the stack pointer search path stack is incremented by 1, and processing proceeds to the processing of step S724 and thereafter.

In the above-described processing at step S716 to step S723, in order to determine the position of insert of a node pair, a bit string comparison is performed between the index key that is to be inserted and index key acquired by searching, and then a check is made of the relative positional relationship between the leading (most significant) bit position at which the bit value is different in the bit string comparison and the discrimination bit position of the branch node of which array element number is stored in the search path stack. The link target of the branch node next to the branch node at which the discrimination bit position is more significant is made the insert position for the node pair to be inserted.

For example, when inserting "111000" into the coupled node tree of FIG. 2B, the index key resulting from the search is the "101011" stored in the node 210h. A bit string comparison between the insert key "111000" and the index key "101011" stored in the node 210h obtains the bit position 1 as the most significant bit position of a bit value that is different. The search path stack is successively traversed in reverse until the relative position relationship between the obtained bit position 1 and the discrimination bit position of the branch node stored in the array element having an array element number stored in the search path stack is such that the discrimination bit position is more significant, so that the root node 210a is reached. At that point the search path stack pointer is incremented by 1 to obtain the array element number of the node 211b. The insert key "111000" is inserted into the link target of the node 211b.

If the root node is reached by traversing the search path stack in reverse but the discrimination bit position of the root node is not a bit position that is more significant than the bit position of the most significant bit having a different bit value in the previously determined bit string comparison, this is the case in which at the upper-order bit of the index key of the coupled node tree the bits that are more significant than the discrimination bit position of the root node all have equal values. This means that in the index key to be inserted, there is the first bit value that differs with the value of a bit that is more significant than the discrimination bit position of the root node. Therefore, the node pair to be inserted becomes the direct link target of the root node, and the discrimination bit position of the root node changes to the position of the most significant bit of the insert key, which differs in value from the existing index key.

Next, the processing of step S724 and thereafter, which is the processing to set data at each node and complete the insert processing, will be described.

At step S724, the array element number that is pointed to by the stack pointer of the search path stack is extracted.

At step S725, 1 (leaf node) is stored in the node type of the array element pointed to by the array element number obtained at step S714 and the insert key is stored in the index key.

Proceeding to step S726, the array element with the array element number obtained at step S724 is read out from the array.

Next, at step S727, the contents read out at step S726 are stored in the array element having the array element number obtained at step S715.

Finally, at step S728, 0 (branch node) is stored in the node type of the array element pointed to by the array element number obtained in step S724, the bit position obtained at step S717 is stored in the discrimination bit position, and the array element number obtained at the step S712 is stored in the coupled node indicator.

In the above-described example of inserting "111000" into the coupled node tree of FIG. 2B, the contents of node 211b are written into the node [0] of the empty node pair that was acquired (step S727) and the node [1] thereof was made a leaf node that holds "111000" (step S725). The bit position 1 of the most significant bit that is the bit value that differs in the bit string comparison is stored in the discrimination bit position of the node 211b, and the array element number of the array element in which is stored the primary node of the acquired node pair is stored into the coupled node indicator (step S728).

Figure 7D:
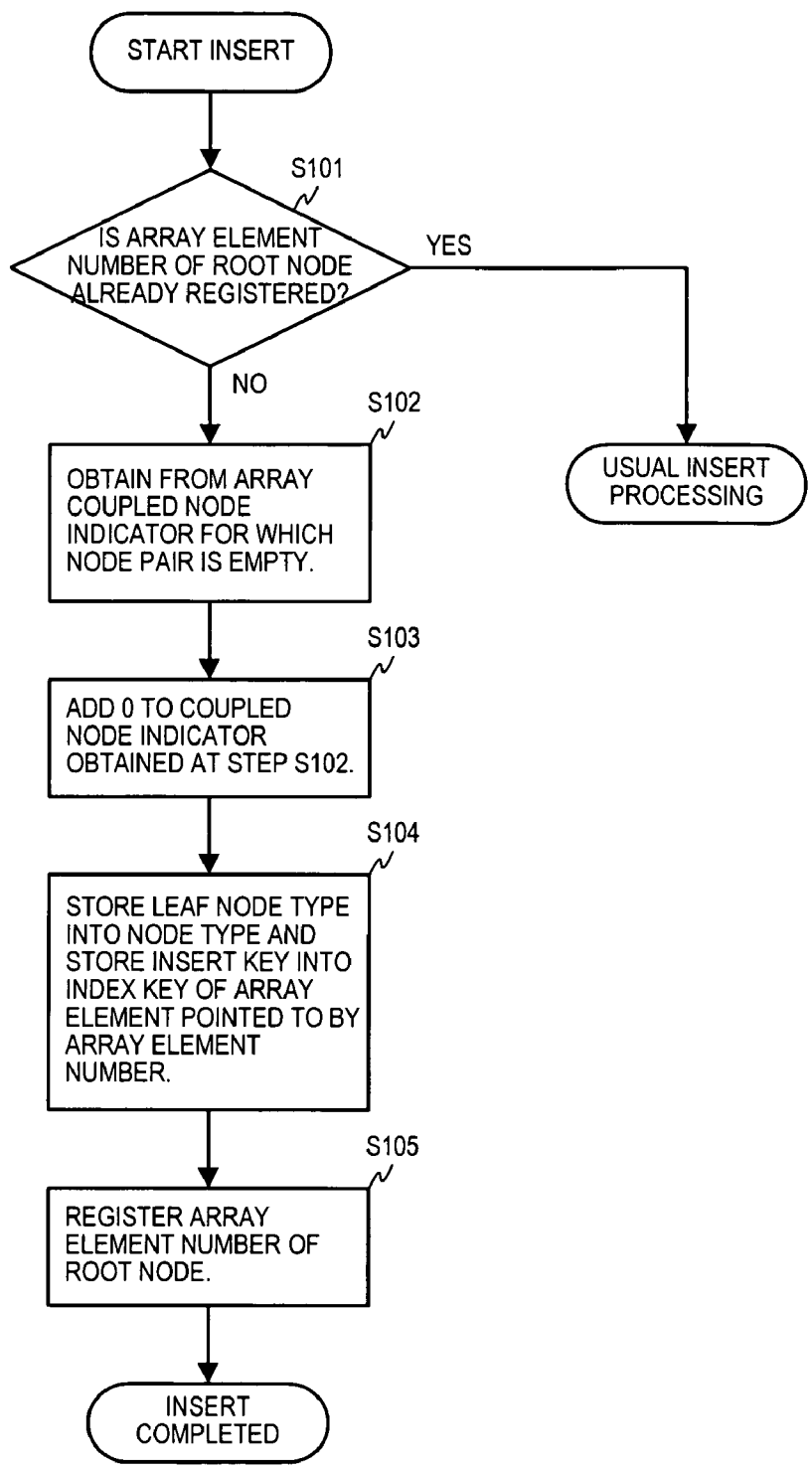
FIG. 7D is a processing flow diagram describing the overall node insert processing for a case in which an index key is added, including root node insert processing.

FIG. 7D is a processing flow diagram describing the overall node insert processing for the case in which an index key is to be inserted, including processing for insert of a root node, proposed in the above cited Japanese Patent Application 2006-187827, and previously filed by the applicant of the present invention.

At step S101, a judgment is made as to whether the array element number of a root node of a coupled node tree that is to be acquired as already been registered. If it has already been registered, the usual insert processing described using FIG. 7A to FIG. 7C is performed.

At step S101, if the judgment is that the registration has not yet been done, this is the case of the generation and registration of a completely new coupled node tree.

First, at step S102, an empty node pair is requested from the array, and the array element number of the array element to be made the primary node of the node pair is acquired. Next at step S103, the array element number is determined by adding 0 to the array element number obtained at step S102. (In actuality, this is equal to the array element number acquired in step S102). Further, at step S104, 1 (leaf node) is stored in the node type of the root node of the array element having the array element number obtained at step S103, and the insert key is stored in the index key, and at step S105 the processing is completed by registering the array element number of the root node acquired at step S102.

As described above, it will be understood that when there is a set of index keys, the index keys are successively extracted therefrom, and the processing of FIG. 7D and FIG. 7A to FIG. 7C is repeated so as to enable the creation of a coupled node tree according to the present invention corresponding to the set of index keys.

Figure 8A:
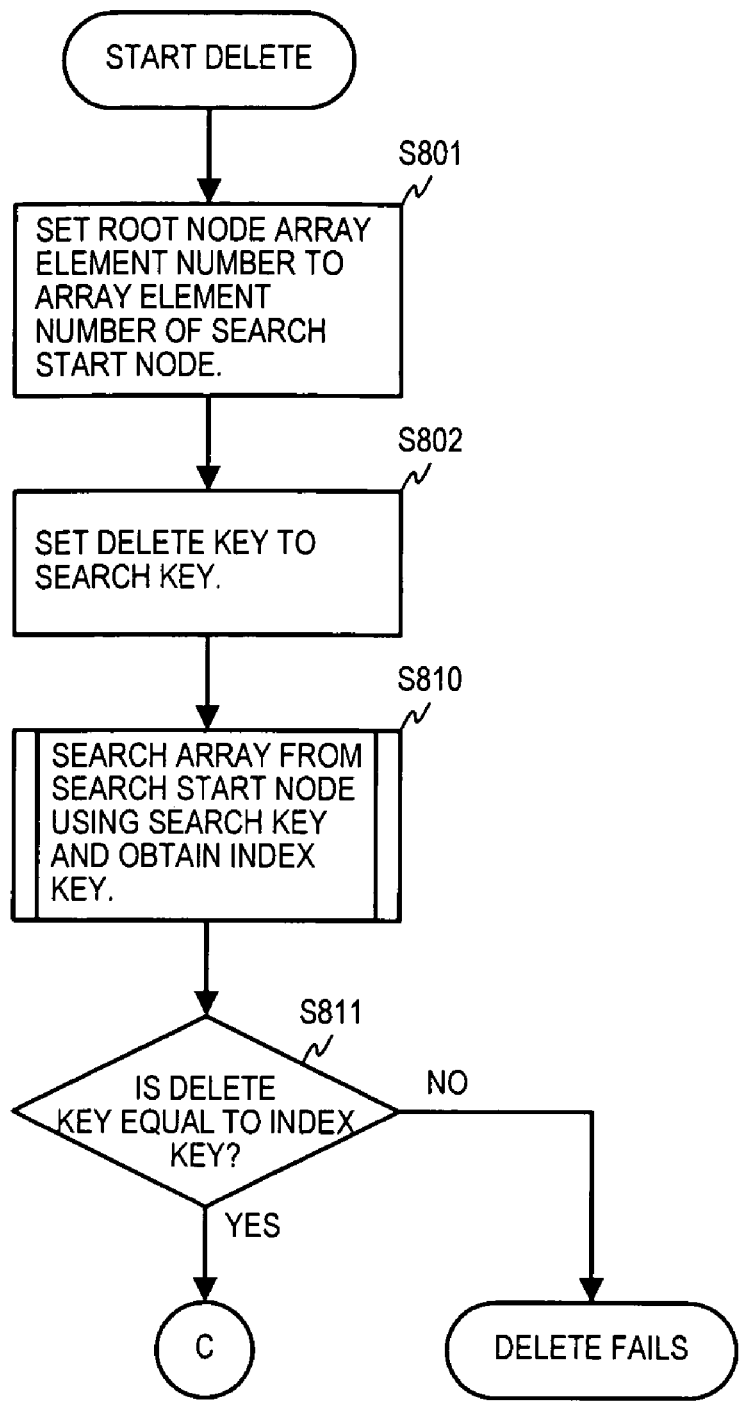
FIG. 8A is a drawing showing the processing flow for search processing, which is the first part of delete processing.
Figure 8B:
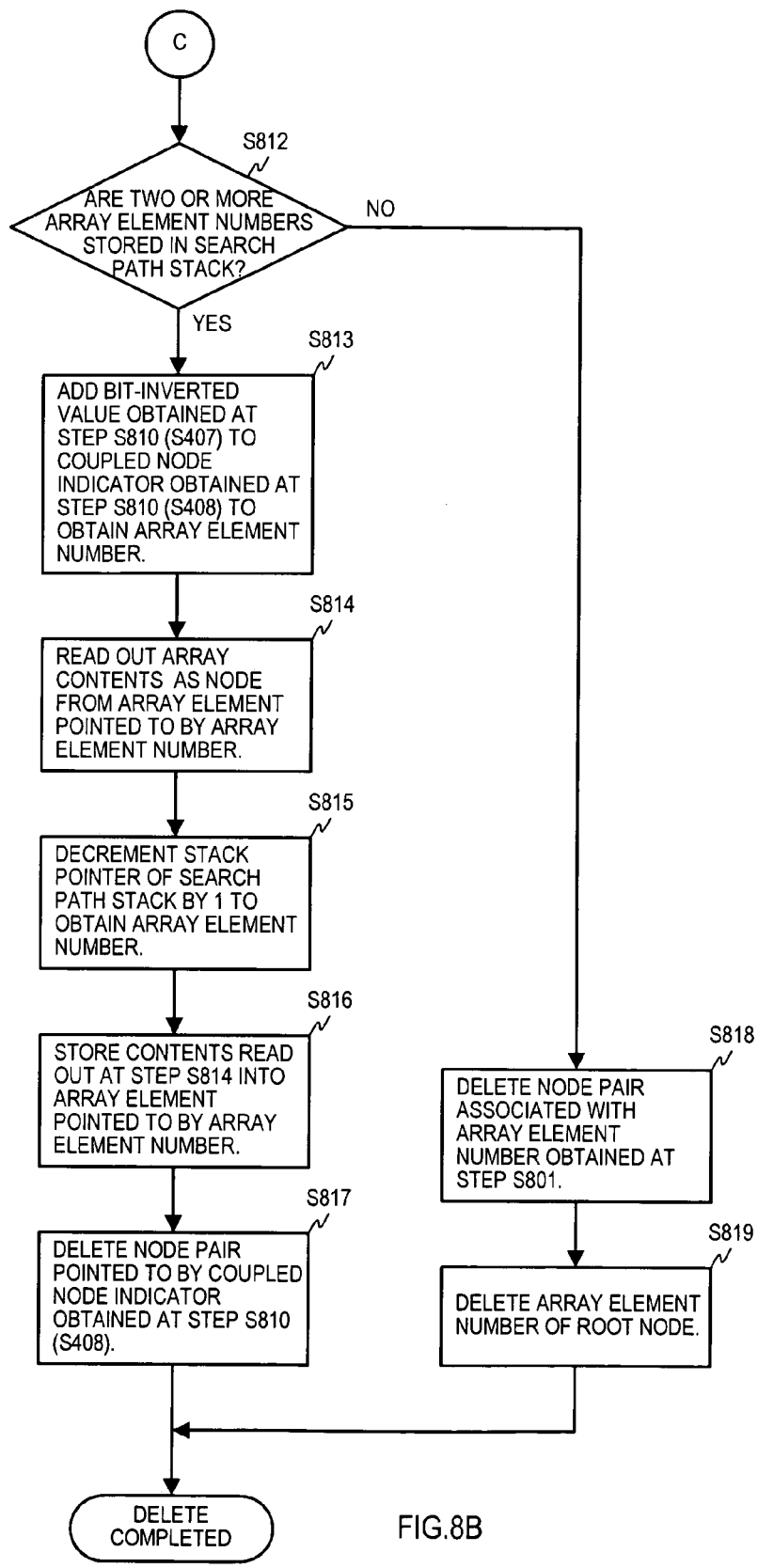
FIG. 8B is a drawing showing the processing flow of the latter part of delete processing.

Next, referring to FIG. 8A and FIG. 8B, the processing flow for deleting a specific index key from a set of index keys associated with the coupled node tree proposed by this applicant in the Japanese patent application 2006-187827.

FIG. 8A is a drawing showing the processing flow for search processing, which is the first stage of delete processing, this corresponding to the using of a delete key as the search key in the searching processing shown in FIG. 4.

In step S801, the array element number of the root node is set in the area for setting the array element number of the search start node, and in step S802 the delete key is set in the search key.

Next, in step S810, the search processing shown in FIG. 4 is executed and an index key that is the search result is obtained and processing proceeds to step S811. In step S811 in FIG. 8A, a comparison is performed between the delete key and the index key and, because if there is no equality the index key to be deleted does not exist in the coupled node tree, the delete fails, and processing ends. If however, there is equality, processing proceeds to step S812 and thereafter in FIG. 8B.

FIG. 8B is a drawing describing the processing flow of the latter stage of the delete processing.

First, at step S812, a judgment is made as to whether or not there are at least 2 array element numbers on the search path stack. Stated differently, the condition in which there are fewer than 2 array element numbers is the one in which there is only 1, this being the array element number of the array element in which the root node is stored. In this case, processing proceeds to step S818, at which the node pair associated with the array element number of the root node obtained at step S801 is deleted. Next, proceeding to step S819, the array element number of the root node that had been registered is deleted, thereby completing the processing.

If at step S812 the judgment is made that there are two or more array element numbers stored in the search path stack, processing proceeds to step S813, at which an array element number is obtained by adding the inversion of the value obtained at step S407 to the coupled node indicator obtained at step S408, both steps being executed in the search processing performed at step S810. This processing is performed to determine the array element number of a node that forms a pair with a leaf node at which is stored the index key to be deleted.

Next, at step S814, the contents of the array element having the array element number obtained at step S813 are read out, and at step S815 the stack pointer of the search path stack is decremented by 1 and the array element number is extracted.

Next, at step S816, the contents of the array element read out at step S814 are written over the array element having the array element number obtained at step S815. This processing replaces the branch node that is the link source to the leaf node in which the index key to be deleted is stored with the above-noted node that forms a pair with the leaf node.

Finally, at step S817, processing is completed by deleting the node pair associated with the coupled node indicator obtained in step S408 which is executed in the search processing performed at step S810. Although the technology related to the coupled node tree that is presupposed in this invention was explained above, if necessary, refer to the specification and drawings described in the above patent application.

Next, referencing FIG. 9 to FIG. 13, the processing to generate the delta data related to this invention is described.

Figure 9:
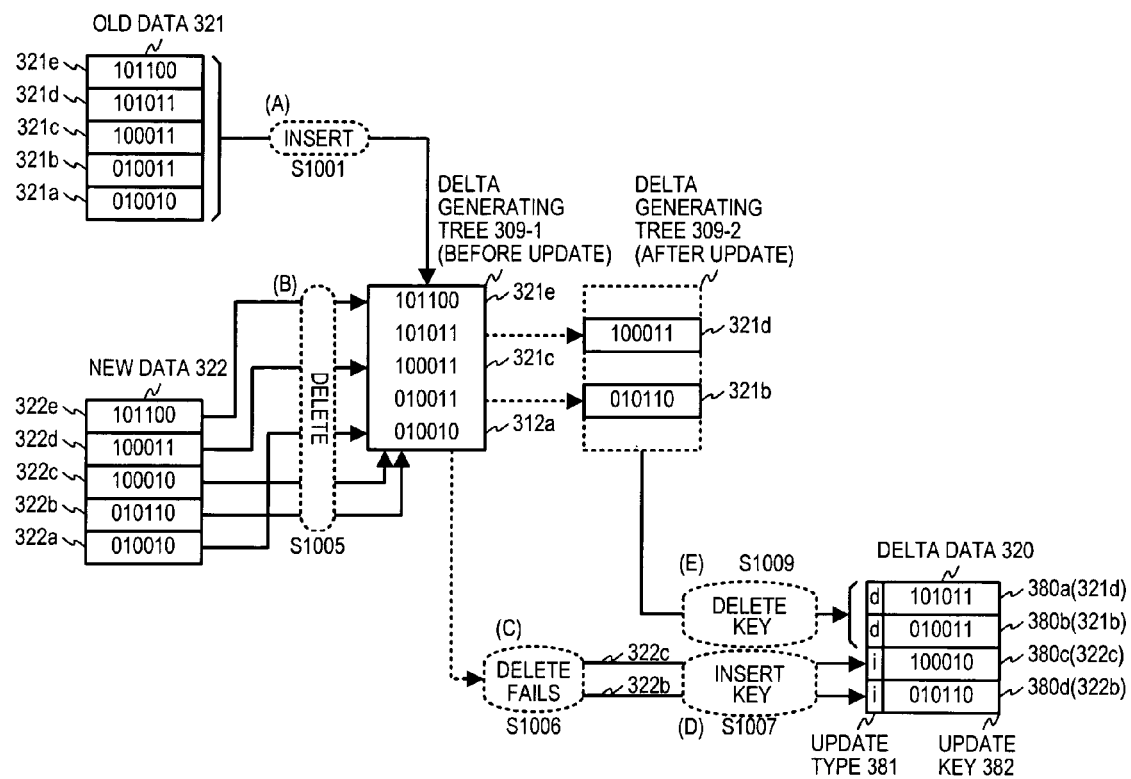
FIG. 9 is a drawing describing an overview of the delta data generating process based on the old and new data.

FIG. 9 is a drawing describing in general the processing to generate the delta data from the old data and the new data, in accordance with one preferred embodiment of this invention.

In the example shown in FIG. 9, the old data 321 comprises the keys 321a "010010", 321b "010011", 321c "100011", 321d "101011", and 321e "101100" while the new data 322 comprises the keys 322a "010010", 322b "010110", 322c "100010", 322d "100011", and 322e "101100".

Also each of the update data 380a to 380d of the delta data 320 consists of the items update type 381 and update key 382. As shown in the drawing, each update key 382 of the update data 380a to 380d is the keys 321d, 321b, 322c, or 322b respectively.

The keys 321a to 321e that are old data are inserted into the pre-update delta generating tree 309-1 by the insert processing shown in section (A) of FIG. 9. Also step S1001 shown in section (A) of FIG. 9 corresponds to the processing of step S1001 of the delta data generation processing flow shown in FIG. 10 cited below. The same also applies to sections (B) to (E) of FIG. 9.

Figure 10:
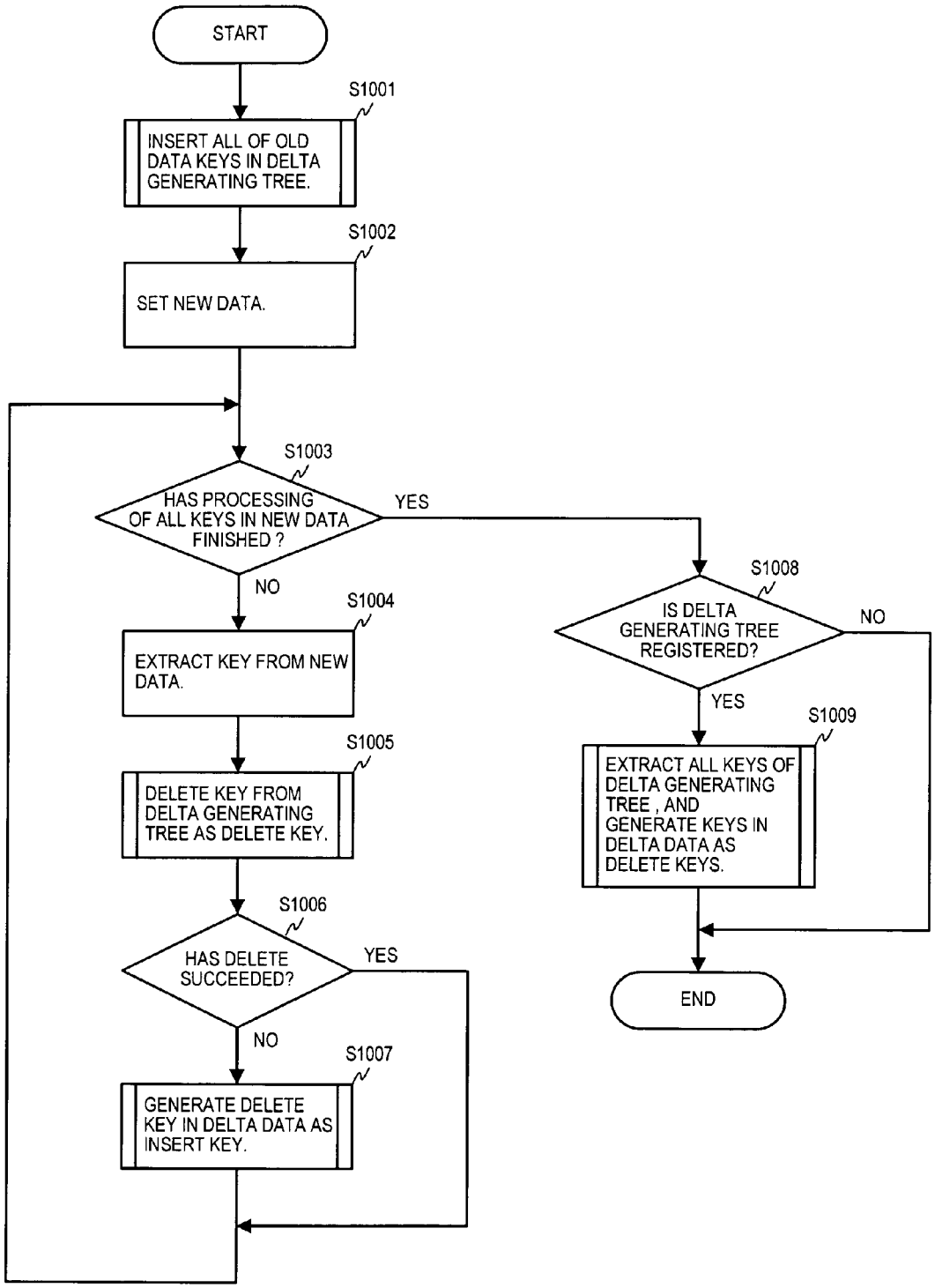
FIG. 10 is a drawing describing the processing flow of the delta data generation based on the old and new data.

Next, delete processing using the keys 322a to 322e of the new data is performed in the flow of step S1005 shown in FIG. 10. As a result of the delete processing, the keys 321d and 321b of the old data have not been deleted and remain in the delta generating tree 309-2 after the update.

The new data keys 322c and 322b, which do not have identical data in the old data and are determined to have failed in the delete of step S1006 of the flow in FIG. 10, as shown in section (C) of FIG. 9, are stored in the delta data store area 320 as insert keys in step S1007 of FIG. 10, as shown in section (D) of FIG. 9. FIG. 9 shows that the values of the insert keys are stored as the update key 382 and values "i" are stored as the update type 381 so as to indicate that the keys 322c and 322b stored in the update key 382 are insert keys.

Meanwhile, the old data keys 321d and 321b remaining in the delta generating tree 309-2 after the update, as shown in section (E) of FIG. 9, are extracted from the delta generating tree 309-2 in step S1009 of FIG. 10 and stored in the delta data store area 320 as delete keys. FIG. 9 shows that the values of the delete keys are stored as the update key 382 and values "d" are stored as the update type 381 so as to indicate that the keys 321d and 321b stored in the update key 382 are delete keys.

In the above description, the delta generating tree 309-1 is generated from the old data and was made the target of delete processing by the new data. But, as was noted above, since the point is to generate the difference between the old data and the new data, it is clear that the delta data can be generated by the reverse wherein the delta generating tree 309-1 is generated from the new data and is made the target of delete processing by the old data. In this case, it will also be clear to one skilled in the art that the new data remaining in the delta generating tree after update becomes insert keys and the old data that fails in the delete process becomes delete keys.

FIG. 10 is a drawing describing the processing flow to generate delta data by means of the old data and the new data. Hereinbelow, referencing FIG. 10, the processing flow to generate delta data by means of the old data and the new data is described.

As shown in FIG. 10, in step S1001, all of the old data keys are inserted into the delta generating tree. Details of this processing are described below referencing FIG. 11. Also, if the old data is already stored in a coupled node tree, that is to say, if the index of a database has the data structure of a coupled node tree, instead of doing step S1001, it is preferable to merely acquire the array element number of the root node. And in the case where the coupled node tree is not stored in an array, it is sufficient to acquire the position information that shows the position of the root node.

Next, in step S1002, the new data is set. Although the setting of this new data is done by storing the new data supplied by the provider of the new data into a new data storage area such as that shown in FIG. 3B or FIG. 9, it is also possible to read out the keys directly from the a storage medium in which is stored the new data supplied by the information provider.

Next, proceeding to step S1003, a determination is made whether processing of all the new data has finished. If processing of all the new data has finished, processing moves to step S1008, and if not, processing proceeds to step S1004.

At step S1004, a key is extracted from the new data set in step S1002. Next, at step S1005, the extracted key is used as a delete key to delete the coinciding valued index key from the delta generating tree. This delete processing is that shown in FIG. 8A and FIG. 8B.

Next in step S1006, a determination is made whether the delete in step S1005 succeeded. If the delete succeeded, return is made to step S1003, and if it fails, in step S1007 the delete key is generated in the delta data as an insert key and return is made to step S1003. Details on the processing in step S1007 are described hereinbelow referencing FIG. 12.

In step S1008, which is branched to from step S1003 when processing of all the new data has been finished, a determination is made whether the delta generating tree is registered. If it s not registered, processing terminates, and if it is registered, at step S1009, all the keys in the delta generating tree are extracted and added to the delta data as delete keys, and processing terminates. Details on the processing in step S1009 are described hereinbelow referencing FIG. 13.

Also it will be evident to one skilled in the art that the flow described in FIG. 10 is just one example and various modifications such as using a method to generate the delta generating tree by the new data as was noted above in the description using FIG. 9 and by partially switching the sequence of the processing and so forth.

Figure 11:
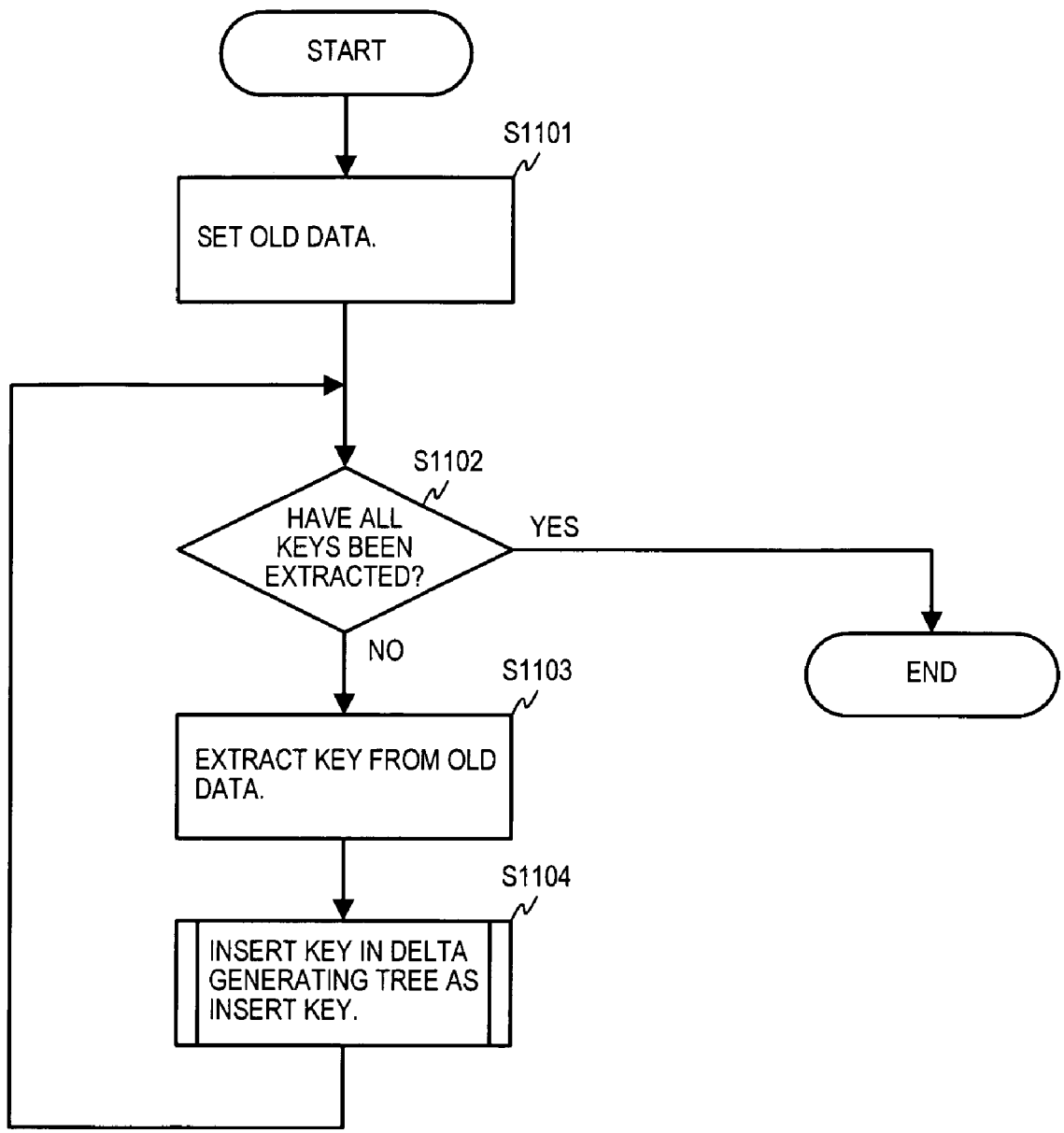
FIG. 11 is a drawing describing the processing flow of generating a coupled node tree based on the old data.

FIG. 11 is a drawing describing the processing flow to generate a coupled node tree (delta generating tree) from the old data, which processing flow is executed at step S1001 of the processing flow to generate delta data from the old data and new data shown in FIG. 10.

At first, in step S1101, the old data is set. Although the setting of this old data is done by storing the old data supplied by the provider of the old data into the old data storage area 321 such as that shown in FIG. 3B or FIG. 9, it is also possible to read out the keys directly from the a storage medium in which is stored the old data supplied by the information provider.

Next, at step S1102, a determination is made whether all the keys have been extracted from the old data and if the extraction is finished processing is terminated.

If not all the keys have been extracted from the old data, in step S1103 a key is extracted from the old data and, proceeding to step S1104, the extracted key is inserted in the delta generating tree as an insert key by the processing shown in FIG. 7A to FIG. 7D. After the insert processing of step S1104, the loop processing of returning to the determination process of step S1102 is repeated until all the keys are extracted from the old data.

Figure 12:
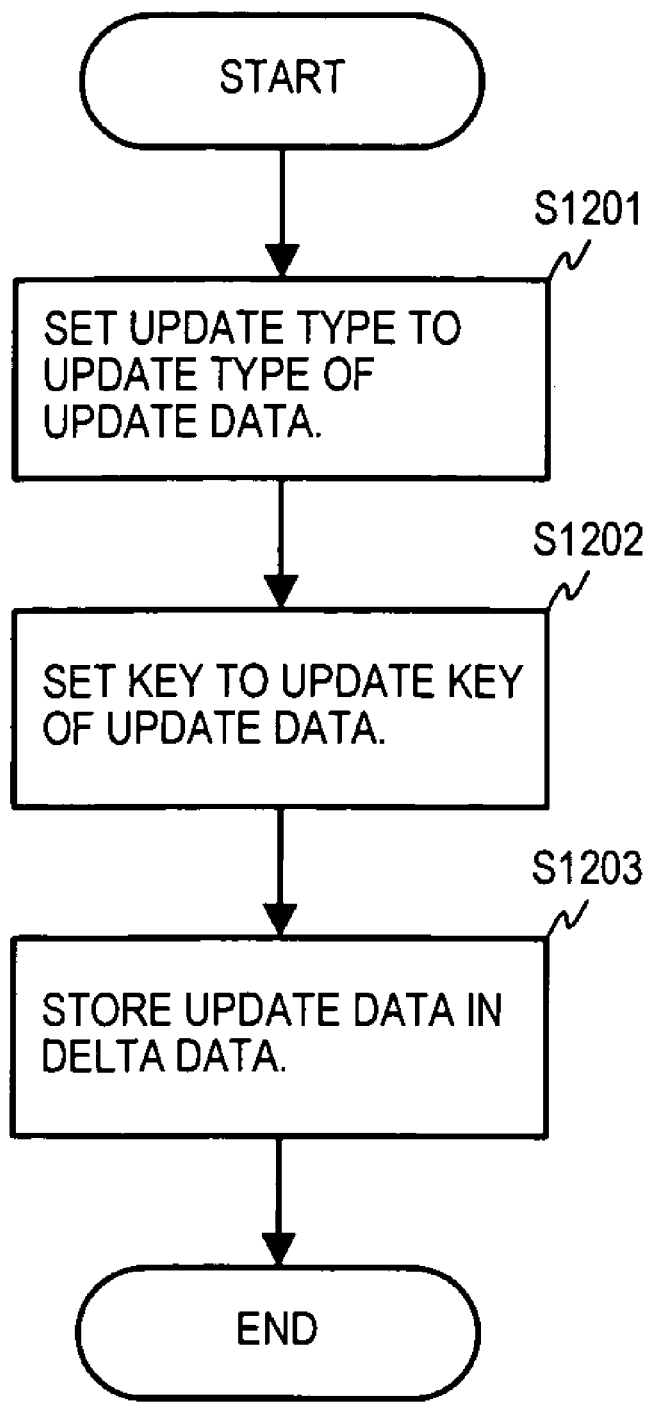
FIG. 12 is a drawing describing the processing flow of storing the updated data in the delta data.

FIG. 12 is a drawing describing the processing flow to store update data in the delta data. The processing flow shown in FIG. 12 is a processing flow that can be applied to the processing to generate delta data with the delete key as an insert key executed in step S1007, which is part of the processing flow of the generation of delta data by means of old data and new data shown in FIG. 10.

Also, The processing flow shown in FIG. 12 can even be applied to the delta data generation processing executed in step S1009 in the processing flow shown in FIG. 10, and it is made so that it receives the information whether the data update is to be an insert or a delete and also the value of the key that is to become the update key of the delta data. Also, it is made to use an unshown update data setting area consisting of the update type and the update key, as a work area.

As shown in the drawing, in step S1201, the update type is set in the update type of the update data setting area based on the information whether the data update is to be an insert or a delete. In the example shown in FIG. 9, the source of the invocation is step S1007, and if the data update is an insert, an "i" is set in the update type.

Next, in step S1202, the value of the key that is to be the update key is set in the update key part of the update data setting area.

Next, in step S1203, the update data set in the update data setting area in step S1201 and step S1202 is stored in the delta data storage area, and processing is terminated.

Figure 13:
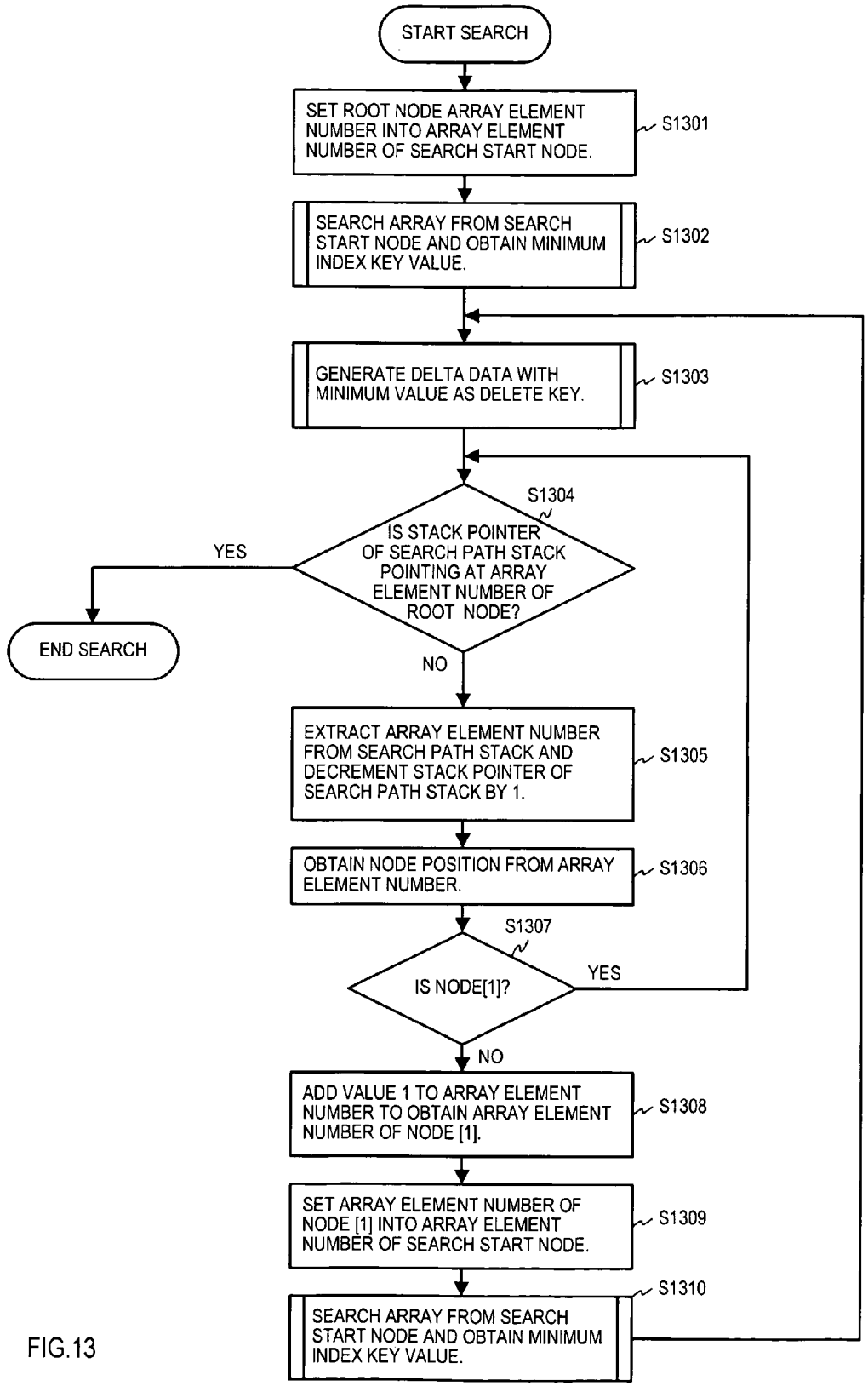
FIG. 13 is a drawing describing the processing flow of generating delta data using keys remaining in the difference tree as delete keys.

FIG. 13 is a drawing describing the processing flow to extract all the keys in the delta generating tree and to generate delta data with them as delete keys, which is the processing executed in S1009, which is part of the processing flow of the generation of delta data by means of old data and new data shown in FIG. 10.

In step S1301, the array element number of the root node of the delta generating tree is set as the array element number of the search start node. Next, the minimum value search showing in FIG. 5 from the search start node is executed so as to obtain the minimum value of the index keys.

Next proceeding to step S1303, delta data is generated with the minimum value obtained in step S1302 as a delete key. The processing in step 1303 is enabled by the processing shown in FIG. 12 of making the update type to be deleting and making the update key value the minimum value obtained in the immediately preceding minimum value search and storing the update data in the delta data.

Thereinafter, as shown in step S1303 and step S1304 to step S1310, repeating the minimum value search the index keys are extracted in ascending order from the delta generating tree, and step S1303 is repeated to generate the delta data by using the extracted minimum values as delete keys.

Thus, since the processing of step S1304 to step S1310 is just the same as the processing of the processing flow of step S604 to step S610 to extract index keys in ascending order, shown in FIG. 6, that description is omitted.

Also since the point of the processing executed in step S1009 shown in FIG. 10 is to extracted all the keys remaining in the delta generating tree, it is not limited to the extraction in ascending order shown in FIG. 13 and the extraction in descending order noted above can also be employed.

The processing described above referencing FIG. 10 to FIG. 13 generates the delta data using the old data and the new data.

Figure 14:
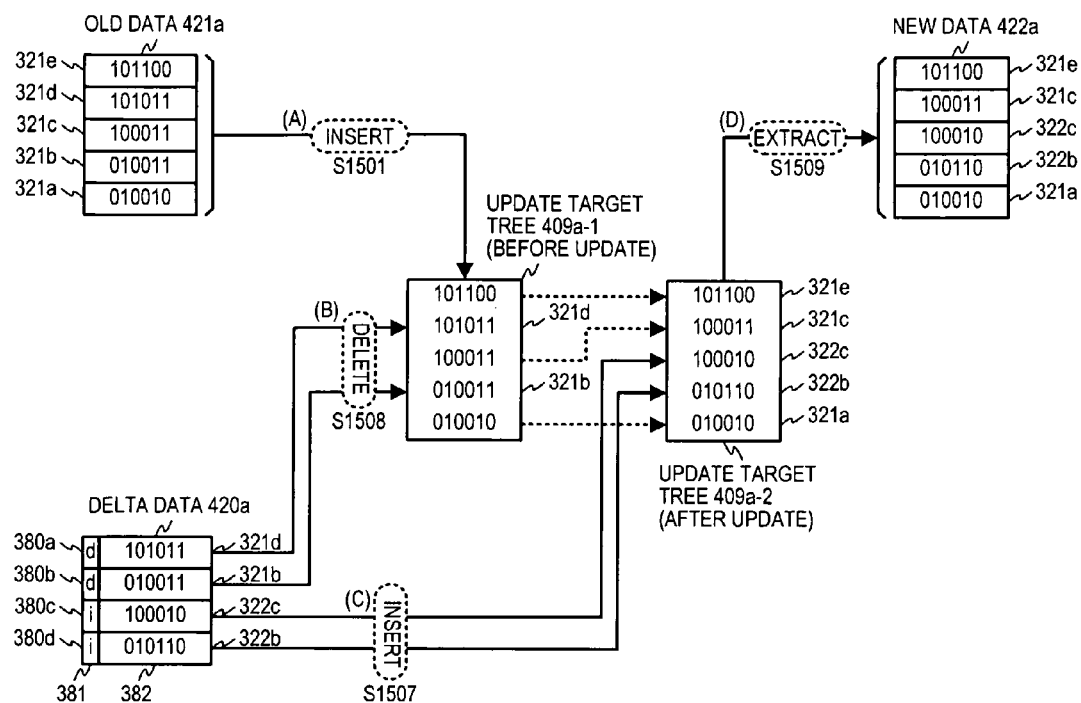
FIG. 14 is a drawing describing an overview of the processing to update old data with new data using the delta data.
Figure 15:
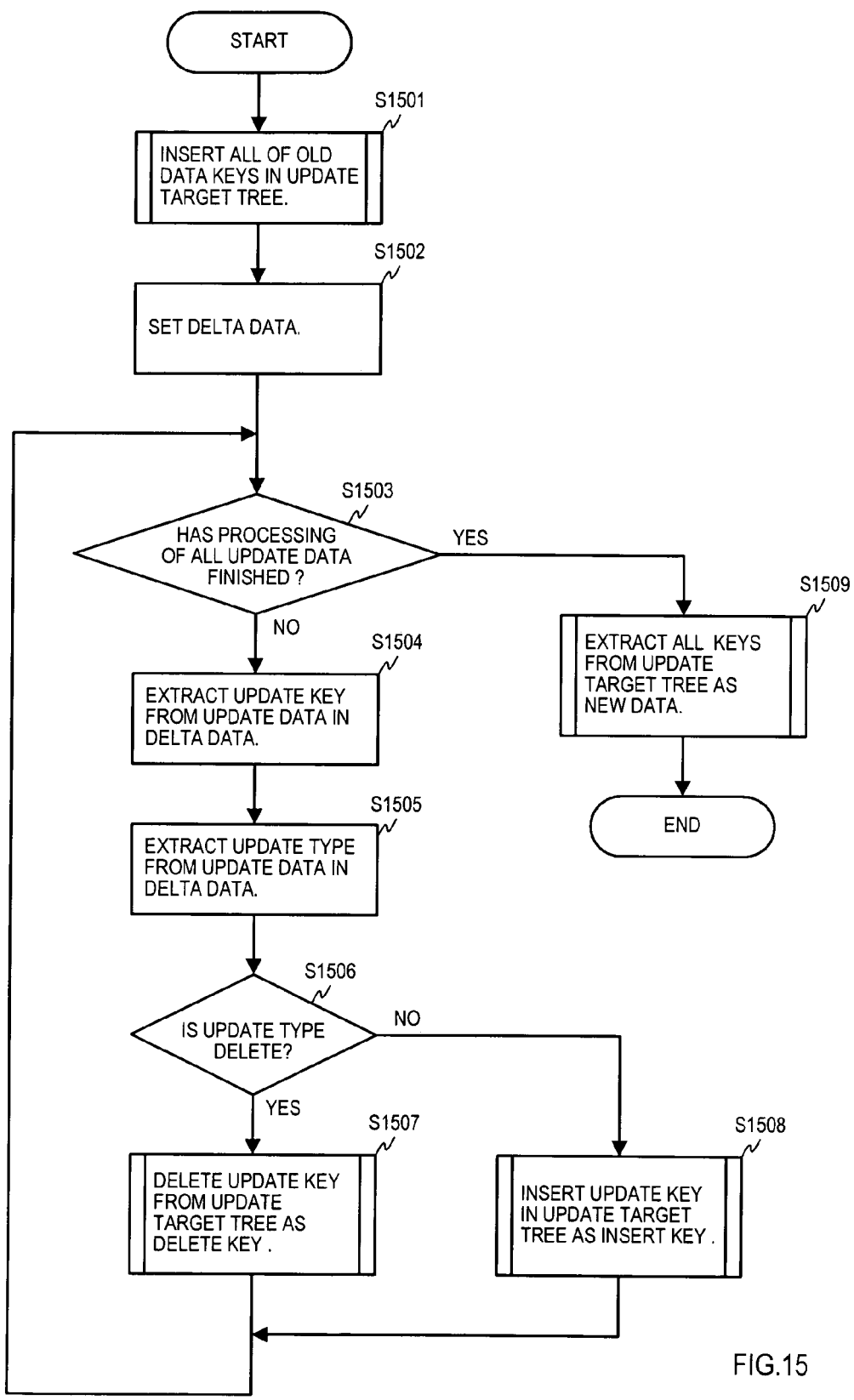
FIG. 15 is a drawing describing the processing flow of updating old data with new data using the delta data.

Next, referencing FIG. 14 and FIG. 15, the processing, related to this invention, to update the old data with the new data by means of the delta data is described.

FIG. 14 is a drawing describing in general the processing to update the old data with the new data by means of the delta data in one preferred embodiment of this invention. The example shown in FIG. 14 is taken to be one that updates the old data in the index key delta data update apparatus 400a shown in FIG. 3B into the new data, using the delta data generated from the old data and new data shown in FIG. 9.

Thus just as for the old data shown in FIG. 9, the old data keys 321a "010010", 321b "010011", 321c "100011", 321d "101011", and 321e "101100" are stored in the index storage area 421a. Also, in the same way, the same data as the update data stored in the delta data storage area shown in FIG. 9 is stored in the delta data storage area 420a.

The keys 321a to 321e which are the old data are to be inserted in the pre-update update target tree 409a-1 by the insert processing shown is section A. Furthermore, S1501 shown in section A of FIG. 14 corresponds to the processing of the flow of step S1501, of the FIG. 15 described later, to update the old data into the new data using delta data. The same relationship between the step codes in FIG. 14 and the processing steps shown in FIG. 15 applies to the later processing of sections (B) to (D).

Next, as shown in section (B) of FIG. 14, of the update data stored in delta data store area 420a, delete processing in step S1508, in the flow shown in FIG. 15, is performed by means of the keys 321b and 321d in the update key area 382 of the update data items 380a and 380b whose update type 381 values are "d".

Furthermore, as shown in section (C) of FIG. 14, of the delta data stored in delta data store area 420a, insert processing in step S1507, in the flow shown in FIG. 15, is performed by means of the keys 322b and 322c in the update key area 382 of the update data items 380c and 380d whose update type 381 values are "i".

As a result, the update target tree 409a-1 before update is updated into update target tree 409a-2 after update. The update target tree 409a-2 includes keys 321a, 321c, and 321e included in the old data and the keys 322b and 322c that were inserted.

Next, as shown in section (D) of FIG. 14, the processing to extract keys from the update target tree 409a-2 after update and store them in the new data store area 422a is done in step S1509 shown in FIG. 15 and the old data is updated into the new data. The new data store area 422a holds the keys 321a "010010", 322b "010110", 322c "100010", 321c "100011", and 321e "101100". Also the new data store area 422a is taken to be the same as the index store area 421a, and the new data can be written over the old data.

Furthermore, although the above description had the insert processing for update target tree 409a-1 being performed after the delete processing, regardless of the sequence in which the delete and insert processing is performed, the result will be the same.

Also, various modifications for generating the update target tree 409a-2 after update are possible, such as extracting only insert keys while generating the update target tree 409a-1 before update by using the extracted insert keys and the old data, and after that generating the update target tree 409a-2 after update by only delete processing, and so forth.

FIG. 15 is a drawing describing the processing flow to update old data into new data by means of delta data.

As shown in FIG. 15, in step S1501, all the keys in the old data are inserted in the update target tree. This processing is realized by the processing to generate a coupled node tree from the old data, which was explained referencing FIG. 11. Just as was noted previously, if the old data is already stored in a coupled node tree, that is to say, if the index of a database has the data structure of a coupled node tree, instead of doing step S1501, it is sufficient to merely acquire the array element number of the root node or the position information that shows the position of the root node. Furthermore in this case, it is also clear that, since the index of the database has the data structure of a coupled node tree, the processing of step S1509 described later is unnecessary.

Next, in step S1502, the delta data is set. Although the setting of this delta data is done by storing the delta data, which was supplied by a provider who generated the delta data with a delta data generation apparatus, into the delta data storage areas 420a to 420x such as those shown in FIG. 3B or FIG. 14, it is also possible to read out the keys directly from the storage medium in which is stored the delta data supplied by the information provider.

Next, at step S1503, a determination is made whether the processing of all the update data has finished.

If the processing of all the update data has finished, processing moves to step S1509 and if the processing has not finished, processing proceeds to step S1504. At step S1504, the update data of the delta data set in step S1502 is extracted, and the update key is extracted from that update data.

In the next step, step S1505, the update type is extracted from the update data, and next, in step S1506, a determination is made of the update type extracted in step S1505.

If the update type is delete, processing proceeds to step S1507, and if it is insert, processing proceeds to step S1508.

At step S1507, the update key is deleted from the update target tree using the update key as a delete key by the delete processing shown in FIG. 8A and FIG. 8B, and a return is made to step S1503.

At step S1508, the update key is inserted in the update target tree using the update key as an insert key by the insert processing shown in FIG. 7A and FIG. 7D, and a return is made to step S1503.

When the processing of all the update data has finished and a branch is made from step S1503 to step S1509, by the ascending order extraction processing shown in FIG. 6, all the keys in the update target tree are extracted as new data and processing terminates.

Although the above description distinguished delete processing and insert processing by means of the update type of the update data, in the delta data generate processing shown in FIG. 10, if the delta data file is generated by dividing it into a delete key file and an insert key file, delete processing and insert processing would be executed separately for each of the their respective files. Also, as was noted in the description for FIG. 14, it is also possible for processing to be done by inserting all the keys in the old data and in the insert key file into the update target tree, and delete processing of the update target tree to be executed by means of the delete keys stored in the delete key file, and by this means the old data can be updated into the new data.

As is clear from the details described above, by using a coupled node tree in accordance with this invention, the index of a database can be efficiently updated from the old data to the new data.

Also, it will be clear to one skilled in the art that the embodiments for implementing this invention are not limited to the above description and the various modifications are possible. Also it clear that the index key updating method of this invention can be constructed on a computer by programs that a computer is caused to execute. Therefore, the programs, and a computer-readable storage medium into which the programs are stored are encompassed by the embodiments of the present invention.

What is claimed is:

1. An index key update method for updating index keys of a database when new data with new index keys is supplied to replace old data with database index keys, comprising:

a delta generating tree acquiring step that acquires a delta generating tree that holds index keys of the old data or new data as index keys in leaf nodes of a coupled node tree which is used in a bit string search and comprises a root node and a node pair, the node pair being a branch node and leaf node, or a pair of branch nodes, or a pair of leaf nodes located in adjacent storage areas, wherein the root node is a node that expresses a starting point of the tree and which is a leaf node when there is one node in the tree and a branch node when there are two or more nodes in the tree, the branch node includes a discrimination bit position for the search key with which the bit string search is performed and position information indicating a position of a primary node, which is one node of a node pair of a link target, and the leaf node includes an index key that is a bit string that is the target of a search, and this tree configuration enabling by repeated linking, at the branch node, to a primary node or a node at a position in a memory area adjacent thereto of a node pair of the link target from an arbitrary node of the tree as a search start node in accordance with a bit value of a search key at the discrimination bit position included in the branch node, until the leaf node is reached, an index key stored in the leaf node to be made a search result key, which is a search result using the search key of an arbitrary subtree having the search start node as its root node;

a delta data generating step that searches the index keys held on the delta generating tree by all the index keys in the new data or old data as the search keys with the root node of the delta generating tree as the search start node and deletes from the delta generating tree an index key that is a search result key and matches a search key and sets as an insert key or delete key in the delta data the search key that does not match the search result key, and after the search using all the index keys in the new data or old data terminates generates in the delta data as delete keys or insert keys the index keys that are not deleted from the delta generating tree and still remain;

an update target tree acquiring step that acquires an update target tree, which is a coupled node tree holding old data index keys as the index keys of leaf nodes; and an old-new index key updating step that generates a new data coupled node tree with the new data index keys as the index keys of its leaf nodes by deleting from update target tree the delete keys extracted from the delta data and inserting in the update target tree insert keys extracted from the delta data and updates the old data into the new data based on the new data coupled node tree.

2. A delta data generation method for generating delta data between old data and new data to be used in an index key update of a database undergoing update of its index keys when new data with new index keys is supplied to replace old data with database index keys, comprising:

a delta generating tree acquiring step that acquires a delta generating tree that holds index keys of the old data or new data as index keys in leaf nodes of a coupled node tree which is used in a bit string search and comprises a root node and a node pair, the node pair being a branch node and leaf node, or a pair of branch nodes, or a pair of leaf nodes located in adjacent storage areas, wherein the root node is a node that expresses a starting point of the tree and which is a leaf node when there is one node in the tree and a branch node when there are two or more nodes in the tree, the branch node includes a discrimination bit position for the search key with which the bit string search is performed and position information indicating a position of a primary node, which is one node of a node pair of a link target, and the leaf node includes an index key that is a bit string that is the target of a search, and this tree configuration enabling by repeated linking, at the branch node, to a primary node or a node at a position in a memory area adjacent thereto of a node pair of the link target from an arbitrary node of the tree as a search start node in accordance with a bit value of a search key at the discrimination bit position included in the branch node, until the leaf node is reached, an index key stored in the leaf node to be made a search result key, which is a search result using the search key of an arbitrary subtree having the search start node as its root node; and a delta data generating step that searches the index keys held on the delta generating tree by all the index keys in the new data or old data as the search keys with the root node of the delta generating tree as the search start node and deletes from the delta generating tree an index key that is a search result key and matches a search key and sets as an insert key or delete key in the delta data the search key that does not match the search result key, and after the search using all the index keys in the new data or old data terminates generates in the delta data as delete keys or insert keys the index keys that are not deleted from the delta generating tree and still remain.

3. The delta data generation method according to claim 2, wherein the coupled node tree is stored in an array and the position information indicating a position of a primary node of a node pair of the link target is the array element number of the array element in the array in which the node is stored.

4. The delta data generation method according to claim 3, wherein the delta generating tree acquiring step makes a leaf node holding an index key first extracted from the old data or new data as the root node of the delta generating tree, and thereinafter repetitively performs index key insert processing steps of searching the related leaf nodes in the delta generating tree using index keys extracted from the old data or new data as search keys while successively storing in a stack the array element numbers of the array elements holding the branch nodes and leaf node in the path traversed up to the leaf node, and executing a magnitude comparison and a bit string comparison between the search key and the index key contained in the leaf node, and determining an insert position for a node pair consisting of a leaf node and another node by a relative position relationship between the first differing bit position found in the bit string comparison and the discrimination bit positions of the branch nodes stored in the stack, and determining into which of the nodes of that node pair is to be inserted the leaf node holding the index key to be inserted by the magnitude relationships.

5. An index key delta data update method for updating index keys of a database using delta data between old data of the index keys in the database and new data of new index keys to replace the old index keys, comprising:

an update target tree acquiring step that acquires an update target tree that holds index keys of the old data as index keys of leaf nodes of a coupled node tree which is used in a bit string search and comprises a root node and a node pair, the node pair being a branch node and leaf node, or a pair of branch nodes, or a pair of leaf nodes located in adjacent storage areas, wherein the root node is a node that expresses a starting point of the tree and which is a leaf node when there is one node in the tree and a branch node when there are two or more nodes in the tree, the branch node includes a discrimination bit position for the search key with which the bit string search is performed and position information indicating a position of a primary node, which is one node of a node pair of a link target, and the leaf node includes an index key that is a bit string that is the target of a search, and this tree configuration enabling by repeated linking, at the branch node, to a primary node or a node at a position in a memory area adjacent thereto of a node pair of the link target from an arbitrary node of the tree as a search start node in accordance with a bit value of a search key at the discrimination bit position included in the branch node, until the leaf node is reached, an index key stored in the leaf node to be made a search result key, which is a search result using the search key of an arbitrary subtree having the search start node as its root node; and an old-new index key updating step that generates a new data coupled node tree holding the index keys of the new data as the index keys of leaf nodes by deleting from the update target tree any delete keys extracted from delta data and inserting in the update target tree any insert keys extracted from delta data, which delete key and insert key of the delta data is generated by searching the index keys on a delta generating tree which is a coupled node tree holding index keys in the old data or new data as the index keys in the leaf nodes of the tree with the root node of the delta generating tree as the search start node by means of all the index keys in the new data or old data as the search keys, and deleting from the delta generating tree an index key that is a search result key and matches a search key and setting as an insert key or delete key in the delta data the search key that does not match the search result key, and, after the search using all the index keys in the new data or old data terminates, generating in the delta data as delete keys or insert keys the index keys that are not deleted from the delta generating tree and still remain, and updates the old data into the new data based on the new data coupled node tree.

6. An index key delta data update method according to claim 5, wherein the coupled node tree is stored in an array and the position information indicating a position of a primary node of a node pair of the link target is the array element number of the array element in the array in which the node is stored.

7. An index key delta data update method according to claim 6, wherein the update target tree acquiring step makes a leaf node holding an index key first extracted from the old data as the root node of the update target tree, and thereinafter repetitively performs index key insert processing steps of searching the related leaf nodes in the update target tree using index keys extracted from the old data as search keys while successively storing in a stack the array element numbers of the array elements holding the branch nodes and leaf node in the path traversed up to the leaf node, and executing a magnitude comparison and a bit string comparison between the search key and the index key contained in the leaf node, and determining an insert position for a node pair consisting of a leaf node and another node by a relative position relationship between the first differing bit position found in the bit string comparison and the discrimination bit positions of the branch nodes stored in the stack, and determining into which of the nodes of that node pair is to be inserted the leaf node holding the index key to be inserted by the magnitude relationships.

8. An index key delta data update method according to claim 7, wherein the update target tree acquiring step, in addition to the index keys of the old data, repeats the index key insert processing steps using index keys extracted from the delta data, and the old-new index key update step generates the new data coupled node tree holding the new data index keys as index keys of leaf nodes by deleting from the update target tree delete keys extracted from the delta data and based on the new data coupled node tree the old data is updated into the new data.

9. An index key delta data update method according to claim 5, wherein the index keys of the old data are stored in a coupled node tree, and the update target tree acquiring step acquires position information indicating the position of the root node of the coupled node tree, and the old-new index key update step updates the old data into the new data by generating the new data coupled node tree.

10. A delta data generation apparatus for generating delta data between old data and new data to be used in an index key update of a database undergoing update of its index keys when new data with new index keys is supplied to replace old data with database index keys, comprising:

a delta generating tree acquiring means that acquires a delta generating tree that holds index keys of the old data or new data as index keys in leaf nodes of a coupled node tree which is used in a bit string search and comprises a root node and a node pair, the node pair being a branch node and leaf node, or a pair of branch nodes, or a pair of leaf nodes located in adjacent storage areas, wherein the root node is a node that expresses a starting point of the tree and which is a leaf node when there is one node in the tree and a branch node when there are two or more nodes in the tree, the branch node includes a discrimination bit position for the search key with which the bit string search is performed and position information indicating a position of a primary node, which is one node of a node pair of a link target, and the leaf node includes an index key that is a bit string that is the target of a search, and this tree configuration enabling by repeated linking, at the branch node, to a primary node or a node at a position in a memory area adjacent thereto of a node pair of the link target from an arbitrary node of the tree as a search start node in accordance with a bit value of a search key at the discrimination bit position included in the branch node, until the leaf node is reached, an index key stored in the leaf node to be made a search result key, which is a search result using the search key of an arbitrary subtree having the search start node as its root node; and a delta data generating means that searches the index keys held on the delta generating tree by all the index keys in the new data or old data as the search keys with the root node of the delta generating tree as the search start node and deletes from the delta generating tree an index key that is a search result key and matches a search key and sets as an insert key or delete key in the delta data the search key that does not match the search result key, and after the search using all the index keys in the new data or old data terminates generates in the delta data as delete keys or insert keys the index keys that are not deleted from the delta generating tree and still remain.

11. An index key delta data update apparatus for updating index keys of a database using delta data between old data of the index keys in the database and new data of new index keys to replace the old data, comprising:

an update target tree acquiring means that acquires an update target tree that holds index keys of the old data as index keys of leaf nodes of a coupled node tree which is used in a bit string search and comprises a root node and a node pair, the node pair being a branch node and leaf node, or a pair of branch nodes, or a pair of leaf nodes located in adjacent storage areas, wherein the root node is a node that expresses a starting point of the tree and which is a leaf node when there is one node in the tree and a branch node when there are two or more nodes in the tree, the branch node includes a discrimination bit position for the search key with which the bit string search is performed and position information indicating a position of a primary node, which is one node of a node pair of a link target, and the leaf node includes an index key that is a bit string that is the target of a search, and this tree configuration enabling by repeated linking, at the branch node, to a primary node or a node at a position in a memory area adjacent thereto of a node pair of the link target from an arbitrary node of the tree as a search start node in accordance with a bit value of a search key at the discrimination bit position included in the branch node, until the leaf node is reached, an index key stored in the leaf node to be made a search result key, which is a search result using the search key of an arbitrary subtree having the search start node as its root node; and an old-new index key updating means that generates a new data coupled node tree holding the index keys of the new data as the index keys of leaf nodes by deleting from the update target tree any delete keys extracted from delta data and inserting in the update target tree any insert keys extracted from delta data, which delete key and insert key of the delta data is generated by searching the index keys on a delta generating tree which is a coupled node tree holding index keys in the old data or new data as the index keys in the leaf nodes of the tree with the root node of the delta generating tree as the search start node by means of all the index keys in the new data or old data as the search keys, and deleting from the delta generating tree an index key that is a search result key and matches a search key and setting as an insert key or delete key in the delta data the search key that does not match the search result key, and, after the search using all the index keys in the new data or old data terminates, generating in the delta data as delete keys or insert keys the index keys that are not deleted from the delta generating tree and still remain, and updates the old data into the new data based on the new data coupled node tree.

12. An index key delta data update apparatus according to claim 11, wherein the index keys of the old data are stored in a coupled node tree, and the update target tree acquiring means acquires position information indicating the position of the root node of the coupled node tree, and the old-new index key update means updates the old data into the new data by generating the new data coupled node tree.

13. A program embodied in a tangible non-transitory recording medium that a computer is caused to execute, for performing a delta data generation method for generating delta data between old data and new data to be used in an index key update of a database undergoing update of its index keys when new data with new index keys is supplied to replace old data with database index keys, comprising:

a delta generating tree acquiring step that acquires a delta generating tree that holds index keys of the old data or new data as index keys in leaf nodes of a coupled node tree which is used in a bit string search and comprises a root node and a node pair, the node pair being a branch node and leaf node, or a pair of branch nodes, or a pair of leaf nodes located in adjacent storage areas, wherein the root node is a node that expresses a starting point of the tree and which is a leaf node when there is one node in the tree and a branch node when there are two or more nodes in the tree, the branch node includes a discrimination bit position for the search key with which the bit string search is performed and position information indicating a position of a primary node, which is one node of a node pair of a link target, and the leaf node includes an index key that is a bit string that is the target of a search, and this tree configuration enabling by repeated linking, at the branch node, to a primary node or a node at a position in a memory area adjacent thereto of a node pair of the link target from an arbitrary node of the tree as a search start node in accordance with a bit value of a search key at the discrimination bit position included in the branch node, until the leaf node is reached, an index key stored in the leaf node to be made a search result key, which is a search result using the search key of an arbitrary subtree having the search start node as its root node; and a delta data generating step that searches the index keys held on the delta generating tree by all the index keys in the new data or old data as the search keys with the root node of the delta generating tree as the search start node and deletes from the delta generating tree an index key that is a search result key and matches a search key and sets as an insert key or delete key in the delta data the search key that does not match the search result key, and after the search using all the index keys in the new data or old data terminates generates in the delta data as delete keys or insert keys the index keys that are not deleted from the delta generating tree and still remain.

14. A program embodied in a tangible non-transitory recording medium that a computer is caused to execute, for performing an index key update method for updating delta data between old data and new data to be used in an index key update of a database undergoing update of its index keys when new data with new index keys is supplied to replace old data with database index keys, comprising:
  an update target tree acquiring step that acquires an update target tree that holds the index keys of the old data as index keys in the leaf nodes of a coupled node tree which is used in a bit string search and comprises a root node and a node pair, the node pair being a branch node and leaf node, or a pair of branch nodes, or a pair of leaf nodes located in adjacent storage areas, wherein
  the root node is a node that expresses a starting point of the tree and which is a leaf node when there is one node in the tree and a branch node when there are two or more nodes in the tree,
  the branch node includes a discrimination bit position for the search key with which the bit string search is performed and position information indicating a position of a primary node, which is one node of a node pair of a link target, and the leaf node includes an index key that is a bit string that is the target of a search, and this tree configuration enabling by repeated linking, at the branch node, to a primary node or a node at a position in a memory area adjacent thereto of a node pair of the link target from an arbitrary node of the tree as a search start node in accordance with a bit value of a search key at the discrimination bit position included in the branch node, until the leaf node is reached, an index key stored in the leaf node to be made a search result key, which is a search result using the search key of an arbitrary subtree having the search start node as its root node; and
  an old-new index key updating step that
  generates a new data coupled node tree holding the new data index keys as index keys of leaf nodes by deleting from the update target tree the delete keys extracted from the delta data generated in the delta data generating step according to claim 13 and inserting in the update target tree the insert keys extracted from that delta data, and updates the old data with the new data based on this new data couple node tree.

\* \* \* \* \*